United States Patent
Bartnik Johansson et al.

(10) Patent No.: US 12,146,038 B2
(45) Date of Patent: Nov. 19, 2024

(54) FAÇADE SYSTEM AND INSULATION ELEMENT FOR A FAÇADE SYSTEM

(71) Applicant: ROCKWOOL A/S, Hedehusene (DK)

(72) Inventors: Dorte Bartnik Johansson, Hedehusene (DK); Miroslav Nikolic, Hedehusene (DK)

(73) Assignee: Rockwool A/S, Hedehusene (DK)

( * ) Notice: Subject to any disclaimer, the term of this patent is extended or adjusted under 35 U.S.C. 154(b) by 165 days.

(21) Appl. No.: 17/916,394

(22) PCT Filed: Apr. 3, 2020

(86) PCT No.: PCT/EP2020/059617
§ 371 (c)(1),
(2) Date: Sep. 30, 2022

(87) PCT Pub. No.: WO2021/197622
PCT Pub. Date: Oct. 7, 2021

(65) Prior Publication Data
US 2023/0142020 A1  May 11, 2023

(51) Int. Cl.
*B32B 5/00* (2006.01)
*B32B 5/02* (2006.01)
(Continued)

(52) U.S. Cl.
CPC ............... *C08J 5/244* (2021.05); *B32B 5/02* (2013.01); *C08H 6/00* (2013.01); *E04B 1/7629* (2013.01);
(Continued)

(58) Field of Classification Search
CPC .......... B32B 2260/00; B32B 2260/021; B32B 2262/108; B32B 2305/076;
(Continued)

(56) References Cited

U.S. PATENT DOCUMENTS 3,093,604 A  6/1963  Ayers
3,285,801 A  11/1966  Sarjeant
(Continued)

FOREIGN PATENT DOCUMENTS

CN  107286873 A  10/2017
EP  1731685 A2  12/2006
(Continued)

OTHER PUBLICATIONS

Masoumeh Ghorbani et al, "Ammoxidized Fenton-Activated Pine Kraft Lignin Accelerates Synthesis and Curing of Resole Resins", Polymers, vol. 9, No. 12, Jan. 28, 2017 (Jan. 28, 2017), p. 43, XPO55574267, DOI: 10.3390/polym9020043.
(Continued)

*Primary Examiner* — Chi Q Nguyen
(74) *Attorney, Agent, or Firm* — Harness, Dickey & Pierce, P.L.C.

(57) ABSTRACT

A façade system for a building, in particular an External Thermal Insulation Composite System (ETICS), comprises a thermal and/or acoustic insulation, consisting of at least one insulation element being a bonded mineral fibre product made of mineral fibres, preferably stone wool fibres, and a cured aqueous binder composition, whereby the insulation element is fixed to an outer surface of the building by mechanical fastening elements and/or an adhesive, covered with a rendering, and whereby the aqueous binder composition prior to curing comprises a first component in form of one or more oxidized lignins, a second component in form of one or more cross-linkers, and a third component in form of one or more plasticizers, whereby the insulation element has a bulk density between 70 kg/m³ and 150 kg/m³.

8 Claims, 10 Drawing Sheets

(51) Int. Cl.
| | |
|---|---|
| *C08H 7/00* | (2011.01) |
| *C08J 5/24* | (2006.01) |
| *E04B 1/76* | (2006.01) |
| *E04B 1/80* | (2006.01) |
| *B32B 5/26* | (2006.01) |

(52) U.S. Cl.
CPC ............... *E04B 1/80* (2013.01); *B32B 5/26* (2013.01); *B32B 2250/20* (2013.01); *B32B 2260/021* (2013.01); *B32B 2262/108* (2013.01); *B32B 2266/126* (2016.11); *B32B 2305/076* (2013.01); *B32B 2307/102* (2013.01); *B32B 2307/304* (2013.01); *B32B 2307/72* (2013.01); *B32B 2419/00* (2013.01); *C08J 2397/00* (2013.01)

(58) Field of Classification Search
CPC ........ B32B 2307/102; B32B 2307/304; B32B 2307/72; B32B 2419/00; C08J 5/244; C08J 2397/00; C08H 6/00; E04B 1/7629; E04B 1/762; E04B 1/80
See application file for complete search history.

(56) References Cited

U.S. PATENT DOCUMENTS

| | | | |
|---|---|---|---|
| 5,382,608 A | 1/1995 | Gardzielia et al. | |
| 6,238,475 B1 | 5/2001 | Gargulak et al. | |
| 6,706,853 B1 | 3/2004 | Stanssens et al. | |
| 8,623,234 B2 | 1/2014 | Jaffrennou et al. | |
| 9,145,688 B2* | 9/2015 | Hunt-Hansen | E04F 13/0803 |
| 9,523,195 B2* | 12/2016 | Nandi | C08G 18/163 |
| 11,219,958 B2* | 1/2022 | Denissen | B23D 53/12 |
| 11,970,866 B2* | 4/2024 | Döhring | C08K 3/346 |
| 2003/0042344 A1 | 3/2003 | Fisch et al. | |
| 2005/0066620 A1* | 3/2005 | Albora | E04C 2/296 52/782.1 |
| 2005/0229504 A1* | 10/2005 | Bennett | E04C 2/24 52/592.1 |
| 2009/0056257 A1* | 3/2009 | Mollinger | B44C 5/0461 52/309.4 |
| 2013/0078422 A1* | 3/2013 | Tinianov | B32B 5/26 442/381 |
| 2013/0112499 A1* | 5/2013 | Kitchen | B32B 7/022 442/268 |
| 2013/0221567 A1* | 8/2013 | Jorgensen | D04H 1/435 524/436 |
| 2014/0115991 A1* | 5/2014 | Sievers | E04C 2/386 52/309.4 |
| 2019/0119439 A1* | 4/2019 | Queen | C08G 63/66 |
| 2019/0338168 A1 | 11/2019 | Laine et al. | |
| 2022/0168994 A1* | 6/2022 | Ghijzen | D04H 1/4209 |

FOREIGN PATENT DOCUMENTS

| | | | |
|---|---|---|---|
| FR | 2976583 A1 | 12/2012 | |
| WO | 2010046074 A1 | 4/2010 | |
| WO | 2012172262 A1 | 12/2012 | |
| WO | WO-2013156466 A1 * | 10/2013 | ............... E04B 1/40 |
| WO | 2018206132 A1 | 11/2018 | |

OTHER PUBLICATIONS

International Search Report and Written Opinion of the ISA issued in PCT/EP2020/059617, mailed Dec. 15, 2020; ISA/EP.

* cited by examiner

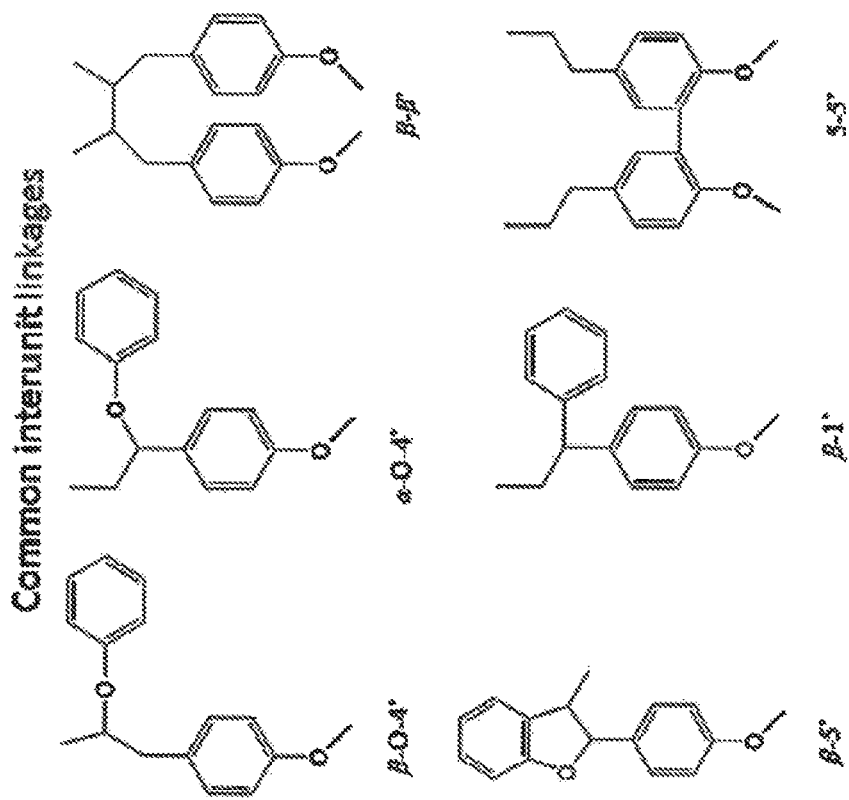
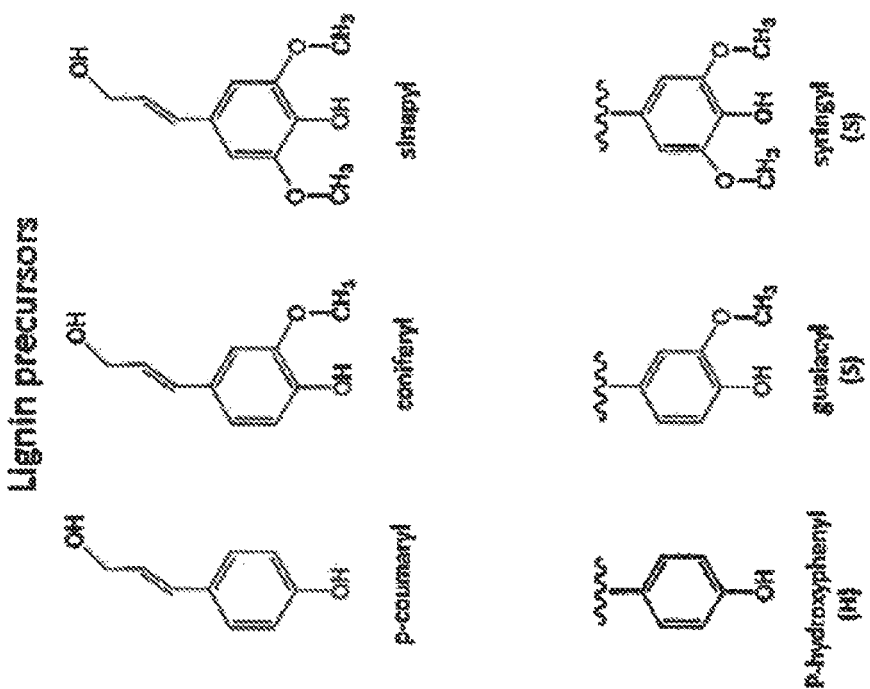
Fig. 12

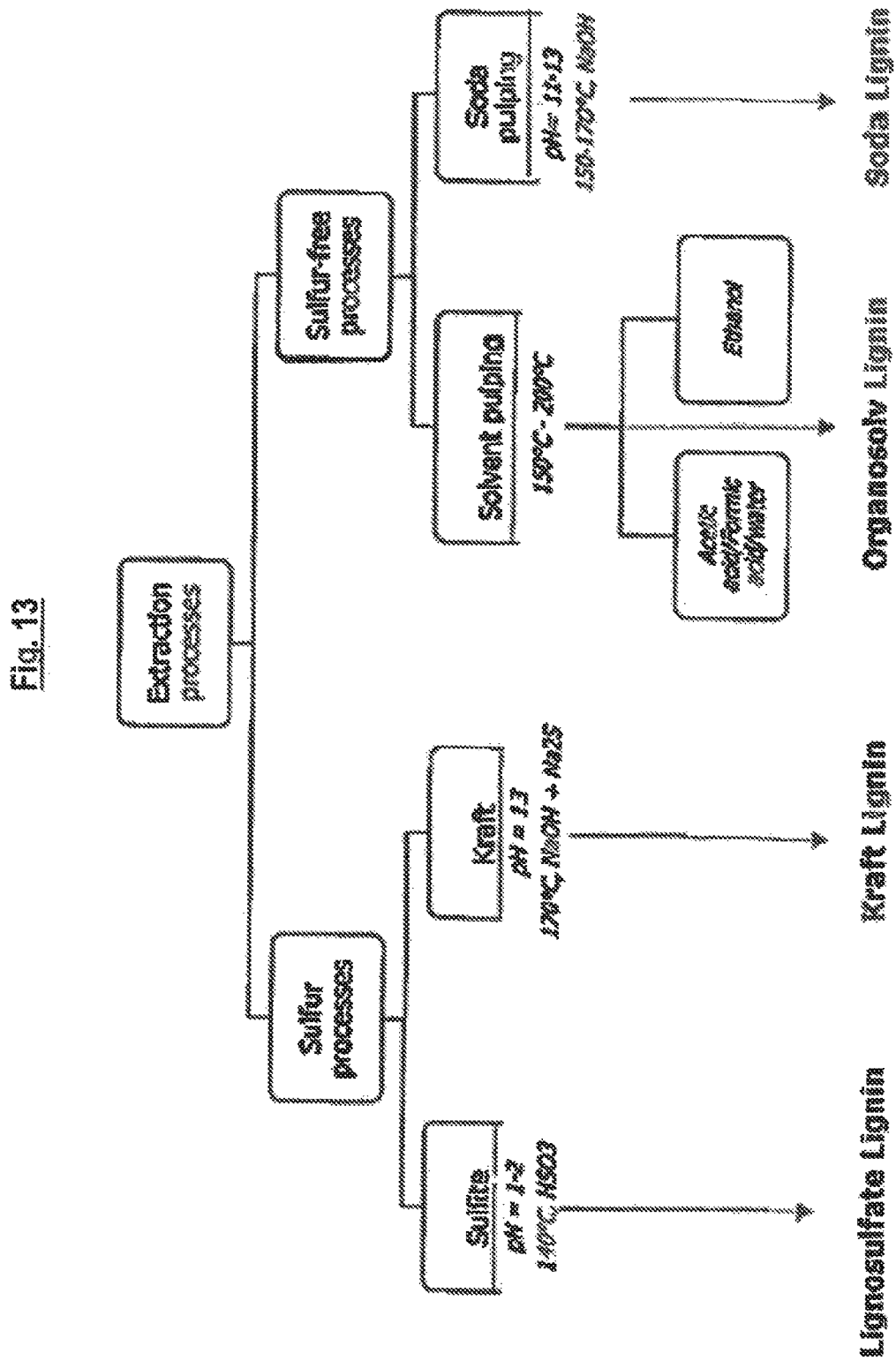

Fig. 14

Properties of technical lignins

| Lignin Type | Sulfur Lignins | | Sulfur-free lignins | |
|---|---|---|---|---|
| | Kraft | Lignosulfate | Soda | Organosolv |
| Raw materials | Softwood Hardwood | Softwood Hardwood | Annual plants | Softwood Hardwood Annual Plants |
| Solubility | Alkali Organic solvents | Water | Alkali | Wide range of organic solvents |
| Number-average molar mass ($M_n$-gmol$^{-1}$) | 1000-3000 | 15,000-50,000 | 800-3000 | 500-5000 |
| Polydispersity | 2.5-3.5 | 6-8 | 2.5-3.5 | 1.5-2.5 |
| $T_g$(°C) | 140-150 | 130 | 140 | 90-110 |

FAÇADE SYSTEM AND INSULATION ELEMENT FOR A FAÇADE SYSTEM

CROSS-REFERENCE TO RELATED APPLICATIONS

This application is a U.S. National Phase Application under 35 U.S.C. 371 of International Application No. PCT/EP2020/059617, filed on Apr. 3, 2020. The entire disclosure of the above application is incorporated herein by reference.

FIELD

The present disclosure relates to a façade system for a building, in particular an External Thermal Insulation Composite System (ETICS), comprising a thermal and/or acoustic insulation, consisting of at least one insulation element being a bonded mineral fibre product made of mineral fibres, preferably stone wool fibres, and a binder, whereby the insulation element is fixed to an outer surface of the building by mechanical fastening elements and/or an adhesive, and covered with a rendering. Furthermore, the present disclosure relates to an insulation element for such a façade system, made of mineral fibres, preferably stone wool fibres, and a binder.

BACKGROUND

This section provides background information related to the present disclosure which is not necessarily prior art.

Façade systems of the above-described type for use as external thermal and/or acoustic insulation of walls of buildings are known in the art. Basically two types of systems are known, namely rear-ventilated facade systems and External Thermal Insulation Composite Systems (ETICSs) with rendering, or combinations of both.

There is disclosed for example in EP 1 731 685 A2 a rear-ventilated thermally insulated building façade which comprises a building wall and an insulating layer of a polymer foam material disposed on the building wall. The system provides a supporting structure disposed on the outside of the insulating layer and a façade cladding supported by said supporting structure. Between said façade cladding and the insulating layer a rear ventilation gap is formed.

The requirements of structural works and building products concerning their arrangement, erection, modification and maintenance are defined and regulated by the construction law, whether in Germany or in other countries, particularly in European countries. These requirements generally serve to prevent the public order and security from being compromised. This particularly applies with respect to safety, i.e. durability (structural, mechanical performance), fire prevention and the prevention or restriction of the spread of fire and smoke. These protection principles form the basis of specific requirements of the construction law to the performance of building materials and building components. Accordingly, there are specific performance requirements for example to external wall claddings, including among others also External Thermal Insulation Composite Systems (ETICS) and rear-ventilated façades.

With respect to ETICSs according to the present disclosure, reference is made to i. a. the Guideline for European Technical Approval of ETICS with rendering ETAG 004, 2008-06, and e.g. European Standard EN 13162:2012+A1: 2015 "Thermal insulation products for buildings—Factory made mineral wool (MW) products", defining respective requirements.

For decades basically two types of insulation products have been used within ETICSs:
Cellular materials, like e.g. expanded polystyrene (EPS);
Fibrous materials, like e.g. mineral wool (MW) and in particular stone wool.

The latter mineral wool products are well-known for their excellent thermal and acoustic properties, as well as their mechanical strength and superior fire resistance. Said products are also referred to as bonded mineral fibre products made of mineral fibres and a binder. Specific requirements for mineral fibre products, respectively mineral wool insulation for use in ETICS, are moreover defined in national German Technical Approval Z-33.40-92, granted 14 Apr. 2011 to an affiliated company of the assignee.

From WO 2010/046074 A1 a façade insulation system is well known, comprising an external thermal insulation composite system (ETICS) and a building wall, wherein the ETICS is affixed to the building wall. The ETICS comprises an insulation sub-system made of at least insulation elements in board like shape containing mineral wool. The insulation elements are fixed to the building wall by use of mechanical fasteners. Furthermore, the known ETICS is provide with an outer layer, e.g. a rendering system comprising mortar or plates. The insulation elements can additionally be fixed by an adhesive, such as mortar or plaster.

An ETICS may conventionally comprise a plurality of insulation elements, which elements are slab or plate shaped with two major surfaces connected with rectangular side surfaces, and which major surfaces are suited for application of plate fasteners, anchors, profiles etc. or a combination of adhesive and mechanical fastening.

To protect the insulation elements of an ETICS and to provide an appealing appearance, the insulation elements are provided with a rendering consisting of one or more layers, e. g. a base coat of plaster and a top or finishing coat. Usually the base coat also contains a reinforcement. The final surface is provided by a top coat, tiles or the like.

Besides insulation elements of expanded polystyrene rigid foam, mineral fibre or mineral wool products, such as rock wool, glass wool or slag wool is used as a material to produce insulation elements for ETICSs. The insulation elements made from mineral fibre products contain a binder to bind the fibres. The strength characteristics for mineral wool insulation elements depend on the density, the binder content and orientation of the mineral fibres. Commercially known insulation elements for ETICSs have a length of 800 mm and a width of 625 mm; other dimensions are known as well.

The mechanical strength, especially the compressive strength of insulation elements made of mineral fibres may be increased through a length and height compression of a mineral fibres mat during production. The tensile or delamination strength perpendicular to the main surfaces, in the following referred to as the delamination strength is however limited because the mineral fibres in the near-surface zones remain largely parallel to the major surfaces for insulation elements produced by this process; this type of insulation element may be referred to as a "laminar plate" having a tensile strength in the range of about 5 to 35 kPa, such as 5 to 20 kPa cf. the EN 1607:2013.

Another way of changing the mechanical properties of mineral fibre insulation elements is to cut several stripes of mineral wool along the direction of the production line to form lamellas of mineral wool. The lamellas are further cut crosswise to the production line and the loose lamellas thus obtained are each turned 90 degrees. The loose lamellas might be used as individual boards of comparably small size or re-assembled by gluing the lamellas together to form a board with a fibre orientation predominantly perpendicular to the major surface of the board, a so-called lamella board. These boards have a high compression strength perpendicular to the major surfaces and high delamination strength. They are applied to an outer surface of a building so the fibre orientation is predominantly perpendicular to the plane of the building surface. Depending on the condition of the building and/or its height such type of products might be fastened to buildings by an adhesive only, without additional mechanical fastening elements.

In addition to these two basic types of insulation elements for the use in an ETICS there are so-called "dual density mineral wool boards" which have a surface layer of 10 to 20 mm of a compacted mineral wool layer with a density of higher than 150 kg/m$^3$. The high-density surface layer is usually provided to improve the mechanical properties of insulation elements to be used in an ETICS.

Mechanical fasteners are used to assure an even high degree of safety for the application of ETICS; this is of particular importance when tall buildings are insulated because higher wind loads prevails in the upper part of tall buildings and a higher weight load prevails in the lower part of tall buildings due to the increasing own mass of the ETICS.

The fasteners are conventionally made of polyamide and fibre-reinforced polyamide when higher loads are prevailing.

Insulation elements made of mineral fibres besides the mineral fibres contain a binder and the amount of binder may influence the mechanical characteristics of the insulation elements. Nevertheless, the amount of binder to be used is limited as the insulation elements have to fulfill the requirements of fire resistance and most of the binders used and described in the following are based on organic components and therefore not highly fire resistant. Furthermore, the binders used are expensive and have several drawbacks as described in the following.

Mineral fibre or mineral wool products generally comprise man-made vitreous fibres (MMVF). The man-made vitreous fibres (MMVF) can have any suitable oxide composition. Said fibres can be glass fibres, ceramic fibres, basalt fibres, slag fibres or rock or stone fibres. The fibres are preferably of the types generally known as rock, stone or slag fibres, most preferably stone fibres, which are bonded together by a cured thermoset polymeric binder material. In certain instances the matrix of mineral fibres may additionally comprise additives, such as aerogel particles, further improving the thermal properties of the final mineral fibre or mineral wool products.

The binder of choice has been phenol-formaldehyde resin which can be economically produced and can be extended with urea prior to use as a binder. However, the existing and proposed legislation directed to the lowering or elimination of formaldehyde emissions have led to the development of formaldehyde-free binders such as, for instance, the binder compositions based on polycarboxy polymers and polyols or polyamines.

Another group of non-phenol-formaldehyde binders are the addition/-elimination reaction products of aliphatic and/or aromatic anhydrides with alkanolamines. These binder compositions are water soluble and exhibit excellent binding properties in terms of curing speed and curing density.

Since some of the starting materials used in the production of these binders are rather expensive chemicals, there is an ongoing need to provide formaldehyde-free binders which are economically produced.

A further effect in connection with previously known aqueous binder compositions for mineral fibres is that at least the majority of the starting materials used for the productions of these binders stem from fossil fuels. There is an ongoing trend of consumers to prefer products that are fully or at least partly produced from renewable materials and there is therefore a need to provide binders for mineral wool which are, at least partly, produced from renewable materials.

A further effect in connection with previously known aqueous binder compositions for mineral fibres is that they involve components which are corrosive and/or harmful. This requires protective measures for the machinery involved in the production of mineral wool products to prevent corrosion and also requires safety measures for the persons handling this machinery. This leads to increased costs and health issues and there is therefore a need to provide mineral fibre products using binder compositions with a reduced content of corrosive and/or harmful materials.

In the meantime, a number of binders for mineral fibre products have been provided, which are to a large extend based on renewable starting materials. In many cases these binders based to a large extend on renewable resources are also formaldehyde-free.

However, many of these binders are still comparatively expensive because they are based on comparatively expensive basic materials.

Moreover, up to now they don't provide adequate strength properties to the final mineral fibre products over time.

Facade systems for buildings, such as ETICSs are to be constructed for a lifetime of 20 years and more and thus require durable materials. Since the loads on such facades are transferred to the structure not only through mechanical fastening the thermal insulation, the bonded mineral fibre products need to be capable of withstanding most of the loading cases, especially wind suction and pressure loads and all-weather conditions likely to be experienced over time. Consequently, mineral fibre products for insulation of external thermal insulation composite systems require a certain robustness which is a matter of density, and which is why such products density typically ranges from e.g. 70 kg/m$^3$ up to around 150 kg/m$^3$ providing certain strength properties, also over time.

Insulation elements of bound mineral fibre products making use of the above-mentioned phenol-formaldehyde resins or urea extended phenol-formaldehyde resins are known to be superior when it comes to loss of strength over time, i.e. due to ageing, and have thus been used for decades. The use of prior art formaldehyde-free or non-added formaldehyde binders (NAF) has proven to be feasible for light-weight products with bulk densities of less than around 60 kg/m$^3$, products that are installed in e.g. cavities or spaces which will subsequently be covered and where there is no need for the products to take-up any loads or provide any specific mechanical resistance. However, these formaldehyde-free binders are seen critical in case of such insulation elements having to withstand loads and mechanical stress for the fact that they are relatively prone to ageing, thus losing their robustness over time.

SUMMARY

This section provides a general summary of the disclosure, and is not a comprehensive disclosure of its full scope or all of its features.

It is therefore an object of the disclosure to provide a façade system with mineral fibre elements being applicable for such a facade and avoiding the use of expensive and/or harmful materials for the binder and/or expensive and/or harmful binders per se.

A further object of the disclosure is to provide mineral fibre elements being applicable for a façade system, especially an ETICS, without using expensive and/or harmful materials for the binder and/or without using expensive and/or harmful binders per se.

In accordance with the present disclosure the façade system comprises an insulation element of mineral fibres having a binder comprising a component (i) in form of one or more oxidized lignins, a component (ii) in form of one or more cross-linkers, a component (iii) in form of one or more plasticizers, and whereby the insulation element has a bulk density of between 70 kg/m$^3$ and 150 kg/m$^3$.

Furthermore, in accordance with the present disclosure the insulation element for the façade system is made of mineral fibres, preferably stone wool fibres, and a binder, whereby the binder comprises a component (i) in form of one or more oxidized lignins, a component (ii) in form of one or more cross-linkers, a component (iii) in form of one or more plasticizers and whereby the insulation element has a bulk density between 70 kg/m$^3$ and 150 kg/m$^3$.

It has been found that it is possible to obtain an insulation element made of mineral fibres and the binder as mentioned before which provides the necessary mechanical stability to be used in a façade and an ETICS for a facade whereby the insulation element does not contain a harmful binder and being free of formaldehyde on the one hand and whereby the binder has a high ageing resistance and only a low loss of strength during the lifetime of the facade system. Furthermore, the amount of binder may be reduced compared to the binders without formaldehyde being used in the prior art, such as e.g. existing NAF binders.

In one embodiment, the insulation element may have any of the preferred features described for the façade system.

Preferably the insulation element has a loss on ignition (LOI) within the range of 2 to 8 wt.-%, preferably between 2 and 5 wt.-%. The binder content is taken as the LOI and determined according to European Standard EN 13820: 2003. The binder includes oil and other binder additives.

According to a preferred embodiment the façade system is provided with insulation elements with a compression strength between 5 and 90 kPa measured in accordance with European Standard EN 826:2013.

According to another embodiment the facade system is provided with insulation elements with a delamination strength between 5 and 100 kPa measured in accordance with European Standard EN 1607:2013.

Such insulation elements of bonded mineral fibre products are known for their superior fire resistance and are typically, if not otherwise treated or covered with coatings or facings, classified in Euroclass A1 according to European Standard EN 13501-1:2018.

In a preferred embodiment, the binder used in insulation elements according to the present disclosure being used in facade systems according to the disclosure are formaldehyde-free.

The term "formaldehyde-free" is defined to characterize an insulation element made of mineral fibres and a binder where the emission is below 5 µg/m$^2$/h of formaldehyde from the insulation element, preferably below 3 µg/m$^2$/h. Preferably, the test is carried out in accordance with ISO 16000 for testing aldehyde emissions.

Component (i)

As component (i) the binder comprises one or more oxidized lignins.

Lignin, cellulose and hemicellulose are the three main organic compounds in a plant cell wall. Lignin can be thought of as the glue, that holds the cellulose fibres together. Lignin contains both hydrophilic and hydrophobic groups. It is the second most abundant natural polymer in the world, second only to cellulose, and is estimated to represent as much as 20 to 30% of the total carbon contained in the biomass, which is more than 1 billion tons globally.

FIG. 11 shows a section from a possible lignin structure.

There are at least four groups of technical lignins available in the market. These four groups are Lignosulfonate lignin, Kraft lignin, Organosolv lignin and Soda lignin are shown in FIG. 13. A possible fifth group, Biorefinery lignin, is a bit different as it is not described by an extraction process, but instead by the process origin, e.g. biorefining and it can thus be similar or different to any of the other groups mentioned. Each group is different from each other and each is suitable for different applications. Lignin is a complex, heterogeneous material composed of up to three different phenyl propane monomers, depending on the source. Softwood lignins are made mostly with units of coniferyl alcohol see FIG. 12 and as a result, they are more homogeneous than hardwood lignins, which has a higher content of syringyl alcohol, see FIG. 12. The appearance and consistency of lignin are quite variable and highly contingent on process.

A summary of the properties of these technical lignins is shown in FIG. 14.

Lignosulfonate from the sulfite pulping process remains the largest commercially available source of lignin, with capacity of 1.4 million tons. But taking these aside, the kraft process is currently the most used pulping process and is gradually replacing the sulfite process. An estimated 78 million tons per year of lignin are globally generated by kraft pulp production but most of it is burned for steam and energy. Current capacity for kraft recovery is estimated at 160,000 tons, but sources indicate that current recovery is only about 75,000 tons. Kraft lignin is developed from black liquor, the spent liquor from the sulfate or kraft process. At the moment, three well-known processes are used to produce the kraft lignin: LignoBoost, LignoForce and SLRP. These three processes are similar in that they involve the addition of $CO_2$ to reduce the pH to 9 to 10, followed by acidification to reduce pH further to approximately 2. The final step involves some combination of washing, leaching and filtration to remove ash and other contaminants. The three processes are in various stages of commercialization globally.

The kraft process introduces thiol groups, stilbene while some carbohydrate remains. Sodium sulphate is also present as an impurity due to precipitation of lignin from liquor with sulphuric acid but can potentially be avoided by altering the way lignin is isolated. The kraft process leads to high amount of phenolic hydroxyl groups and this lignin is soluble in water when these groups are ionized (above pH~10).

Commercial kraft lignin is generally higher in purity than lignosulfonates. The molecular weight is 1000-3000 g/mol.

Soda lignin originates from sodium hydroxide pulping processes, which are mainly used for wheat straw, bagasse and flax. Soda lignin properties are similar to kraft lignins one in terms of solubility and $T_g$. This process does not utilize sulfur and there is no covalently bound sulfur. The ash level is very low. Soda lignin has a low solubility in neutral and acid media but is completely soluble at pH 12 and higher.

The lignosulfonate process introduces large amount of sulfonate groups making the lignin soluble in water but also in acidic water solutions. Lignosulfonates has up to 8% sulfur as sulfonate, whereas kraft lignin has 1 to 2% sulfur, mostly bonded to the lignin. The molecular weight of lignosulfonate is 15.000 to 50.000 g/mol. This lignin contains more leftover carbohydrates compared to other types and has a higher average molecular weight. The typical hydrophobic core of lignin together with large number of ionized sulfonate groups make this lignin attractive as a surfactant and it often finds application in dispersing cement etc.

A further group of lignins becoming available is lignins resulting from biorefining processes in which the carbohydrates are separated from the lignin by chemical or biochemical processes to produce a carbohydrate rich fraction. This remaining lignin is referred to as biorefinery lignin. Biorefineries focus on producing energy, and producing substitutes for products obtained from fossil fuels and petrochemicals as well as lignin. The lignin from this process is in general considered a low value product or even a waste product mainly used for thermal combustion or used as low-grade fodder or otherwise disposed of.

Organosolv lignin availability is still considered on the pilot scale. The process involves extraction of lignin by using water together with various organic solvents (most often ethanol) and some organic acids. An advantage of this process is the higher purity of the obtained lignin but at a much higher cost compared to other technical lignins and with the solubility in organic solvents and not in water.

Previous attempts to use lignin as a basic compound for binder compositions for mineral fibres failed because it proved difficult to find suitable cross-linkers which would achieve desirable mechanical properties of the cured mineral wool product and at the same time avoid harmful and/or corrosive components. Presently lignin is used to replace oil derived chemicals, such as phenol in phenolic resins in binder applications or in bitumen. It is also used as cement and concrete additives and in some aspects as dispersants.

The cross-linking of a polymer in general should provide improved properties like mechanical, chemical and thermal resistance etc. Lignin is especially abundant in phenolic and aliphatic hydroxyl groups that can be reacted leading to cross-linked structure of lignin, Different lignins will also have other functional groups available that can potentially be used. The existence of these other groups is largely dependent on the way lignin was separated from cellulose and hemicellulose (thiols in kraft lignin, sulfonates in ligno-sulfonate etc.) depending on the source.

It has been found that by using oxidized lignins, binder compositions for mineral fibres can be prepared which allow excellent properties of the mineral fibre product produced.

In one embodiment, the component (i) is in form of one or more oxidized kraft lignins.

In one embodiment, the component (i) is in form of one or more oxidized soda lignins.

In one embodiment, the component (i) in form of one or more oxidized lignins is in form of one or more ammonia-oxidized lignins. For the purpose of the present disclosure, the term "ammonia-oxidized lignins" is to be understood as a lignin that has been oxidized by an oxidation agent in the presence of ammonia. The term "ammonia-oxidized lignin" is abbreviated as AOL.

In an alternative embodiment, the ammonia is partially or fully replaced by an alkali metal hydroxide, in particular sodium hydroxide and/or potassium hydroxide.

A typical oxidation agent used for preparing the oxidized lignins is hydrogen peroxide.

In one embodiment, the ammonia-oxidized lignin comprises one or more of the compounds selected from the group of ammonia, amines, hydroxides or any salts thereof.

In one embodiment, the component (i) in form of one or more oxidized lignins is having a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component in form of one or more oxidized lignins.

In one embodiment, the component (i) in form of one or more oxidized lignins is having an average carboxylic acid group content of more than 1.5 groups per macromolecule of component (i) in form of one or more oxidized lignins, such as more than 2 groups, such as more than 2.5 groups.

It is believed that the carboxylic acid group content of the oxidized lignins play an important role in the surprising advantages of the aqueous binder compositions used for mineral fibres elements according to the present disclosure, In particular, it is believed that the carboxylic acid group of the oxidized lignins improve the cross-linking properties and therefore allow better mechanical properties of the cured mineral fibre products.

Component (ii)

Component (ii) of the binder is in form of one or more cross-linkers.

In one embodiment, the component (ii) comprises one or more cross-linkers selected from ß-hydroxyalkylamide-cross-linkers and/or oxazoline-cross-linkers.

β-hydroxyalkylamide-cross-linkers is a curing agent for the acid-functional macromolecules. It provides a hard, durable, corrosion resistant and solvent resistant cross-linked polymer network. It is believed the ß-hydroxyalkyl-amide-cross-linkers cure through esterification reaction to form multiple ester linkages. The hydroxy functionality of the β-hydroxyalkylamide-cross-linkers should be an average of at least 2, preferably greater than 2 and more preferably 2 to 4 in order to obtain optimum curing response.

Oxazoline group containing cross-linkers are polymers containing one of more oxazoline groups in each molecule and generally, oxazoline containing crosslinkers can easily be obtained by polymerizing an oxazoline derivative. The patent U.S. Pat. No. 6,818,699 B2 provides a disclosure for such a process.

In one embodiment, the component (ii) is an epoxidized oil based on fatty acid triglyceride.

It is noted that epoxidized oils based on fatty acid triglycerides are not considered hazardous and therefore the use of these compounds in the binder compositions according to the present disclosure do not render these compositions unsafe to handle.

In one embodiment, the component (ii) is a molecule having three or more epoxy groups.

In one embodiment, the component (ii) is one or more flexible oligomer or polymer, such as a low Tg acrylic based polymer, such as a low Tg vinyl based polymer, such as low $T_g$ polyether, which contains reactive functional groups such as carbodiimide groups, such as anhydride groups, such as oxazoline groups, such as amino groups, such as epoxy groups.

In one embodiment, the component (ii) is selected from the group consisting of cross-linkers taking part in a curing reaction, such as hydroxyalkylamide, alkanolamine, a reaction product of an alkanolamine and a polycarboxylic acid. The reaction product of an alkanolamine and a polycarboxylic acid can be found in U.S. Pat. No. 6,706,853 B1.

Without wanting to be bound by any particular theory, it is believed, that the very advantageous properties of the aqueous binder compositions used with the present disclosure are due to the interaction of the oxidized lignins used as component (i) and the cross-linkers mentioned above. It is believed that the presence of carboxylic acid groups in the oxidized lignins enable the very effective cross-linking of the oxidized lignins.

In one embodiment, the component (ii) is one or more cross-linkers selected from the group consisting of multi-functional organic amines such as an alkanolamine, diamines, such as hexamethyldiamine, triamines.

In one embodiment, the component (ii) is one or more cross-linkers selected from the group consisting of polyethylene imine, polyvinyl amine, fatty amines.

In one embodiment, the component (ii) is one or more fatty amides.

In one embodiment, the component (ii) is one or more cross-linkers selected from the group consisting of dimethoxyethanal, glycolaldehyde, glyoxalic acid.

In one embodiment, the component (ii) is one or more cross-linkers selected from polyester polyols, such as polycaprolactone.

In one embodiment, the component (ii) is one or more cross-linkers selected from the group consisting of starch, modified starch, CMC.

In one embodiment, the component (ii) is one or more cross-linkers in form of aliphatic multifunctional carbodiimides.

In one embodiment, the component (ii) is one or more cross-linkers selected from melamine based cross-linkers, such as a hexakis(methylmethoxy)melamine (HMMM) based cross-linkers.

Examples of such compounds are Picassian XL 701, 702, 725 (Stahl Polymers), such as ZOLDINE® XL-29SE (Angus Chemical Company), such as CX300 (DSM), such as Carbodilite V-02-L2 (Nisshinbo Chemical Inc.).

Component (ii) can also be any mixture of the above-mentioned compounds.

In one embodiment, the binder composition used with the present disclosure comprises component (ii) in an amount of 1 to 40 wt.-%, such as 4 to 20 wt.-%, such as 6 to 12 wt.-%, based on the dry weight of the first component.

Component (iii)

Component (iii) is in form of one or more plasticizers.

In one embodiment, component (iii) is in form of one or more plasticizers selected from the group consisting of polyols, such as carbohydrates, hydrogenated sugars, such as sorbitol, erythriol, glycerol, monoethylene glycol, polyethylene glycols, polyethylene glycol ethers, polyethers, phthalates and/or acids, such as adipic acid, vanillic acid, lactic acid and/or ferullic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups, polyamides, amides such as carbamide/urea, or any mixtures thereof.

In one embodiment, component (iii) is in form of one or more plasticizers selected from the group consisting of carbonates, such as ethylene carbonate, propylene carbonate, lactones, lactams, lactides, compounds with a structure similar to lignin like vanillin, acetosyringone, solvents used as coalescing agents like alcohol ethers, polyvinyl alcohol.

In one embodiment, component (iii) is in form of one or more non-reactive plasticizer selected from the group consisting of polyethylene glycols, polyethylene glycol ethers, polyethers, hydrogenated sugars, phthalates and/or other esters, solvents used as coalescing agents like alcohol ethers, acrylic polymers, polyvinyl alcohol.

In one embodiment, component (iii) is one or more reactive plasticizers selected from the group consisting of carbonates, such as ethylene carbonate, propylene carbonate, lactones, lactams, lactides, di- or tricarboxylic acids, such as adipic acid, or lactic acid, and/or vanillic acid and/or ferullic acid, polyurethane dispersions, acrylic based polymers with free carboxy groups, compounds with a structure similar to lignin like vanillin, acetosyringone.

In one embodiment, component (iii) is in form of one or more plasticizers selected from the group consisting of fatty alcohols, monohydroxy alcohols such as pentanol, stearyl alcohol.

In one embodiment, component (iii) comprises one or more plasticizers selected from the group consisting of polyethylene glycols, polyethylene glycol ethers.

Another particular surprising aspect of the present disclosure is that the use of plasticizers having a boiling point of more than 100° C., in particular 140 to 250° C., strongly improves the mechanical properties of the mineral fibre products according to the present disclosure although, in view of their boiling point, it is likely that these plasticizers will at least in part evaporate during the curing of the aqueous binders in contact with the mineral fibres.

In one embodiment, component (iii) comprises one or more plasticizers having a boiling point of more than 100° C., such as 110 to 280° C., more preferred 120 to 260 C, more preferred 140 to 250° C.

It is believed that the effectiveness of these plasticizers in the aqueous binder composition according to the present disclosure is associated with the effect of increasing the mobility of the oxidized lignins during the curing process. It is believed that the increased mobility of the lignins or oxidized lignins during the curing process facilitates the effective cross-linking.

In one embodiment, component (iii) comprises one or more polyethylene glycols having an average molecular weight of 150 to 50000 g/mol, in particular 150 to 4000 g/mol, more particular 150 to 1000 g/mol, preferably 150 to 500 g/mol, more preferably 200 to 400 g/mol.

In one embodiment, component (iii) comprises one or more polyethylene glycols having an average molecular weight of 4000 to 25000 g/mol, in particular 4000 to 15000 g/mol, more particular 8000 to 12000 g/mol.

In one embodiment component (iii) is capable of forming covalent bonds with component (i) and/or component (ii) during the curing process. Such a component would not evaporate and remain as part of the composition but will be effectively altered to not introduce unwanted side effects e.g. water absorption in the cured product. Non-limiting examples of such a component are caprolactone and acrylic based polymers with free carboxyl groups.

In one embodiment, component (iii) is selected from the group consisting of fatty alcohols, monohydroxy alcohols, such as pentanol, stearyl alcohol.

In one embodiment, component (iii) is selected from one or more plasticizers selected from the group consisting of alkoxylates such as ethoxylates such as butanol ethoxylates, such as butoxytriglycol.

In one embodiment, component (iii) is selected from one or more propylene glycols.

In one embodiment, component (iii) is selected from one or more glycol esters.

In one embodiment, component (iii) is selected from one or more plasticizers selected from the group consisting of adipates, acetates, benzoates, cyclobenzoates, citrates, stearates, sorbates, sebacates, azelates, butyrates, valerates.

In one embodiment, component (iii) is selected from one or more plasticizers selected from the group consisting of phenol derivatives such as alkyl or aryl substituted phenols.

In one embodiment, component (iii) is selected from one or more plasticizers selected from the group consisting of silanols, siloxanes.

In one embodiment, component (iii) is selected from one or more plasticizers selected from the group consisting of sulfates such as alkyl sulfates, sulfonates such as alkyl aryl sulfonates such as alkyl sulfonates, phosphates such as tripolyphosphates; such as tributylphosphates.

In one embodiment, component (iii) is selected from one or more hydroxy acids.

In one embodiment, component (iii) is selected from one or more plasticizers selected from the group consisting of monomeric amides such as acetamides, benzamide, fatty acid amides such as tall oil amides.

In one embodiment, component (iii) is selected from one or more plasticizers selected from the group consisting of quaternary ammonium compounds such as trimethylglycine, distearyldimethylammoniumchloride.

In one embodiment, component (iii) is selected from one or more plasticizers selected from the group consisting of vegetable oils such as castor oil, palm oil, linseed oil, tall oil, soybean oil.

In one embodiment, component (iii) is selected from one or more plasticizers selected from the group consisting of hydrogenated oils, acetylated oils.

In one embodiment, component (iii) is selected from one or more fatty acid methyl esters.

In one embodiment, component (iii) is selected from one or more plasticizers selected from the group consisting of alkyl polyglucosides, gluconamides, aminoglucoseamides, sucrose esters, sorbitan esters.

It has surprisingly been found that the inclusion of plasticizers in the aqueous binder compositions according to the present disclosure strongly improves the mechanical properties of the mineral fibre products according to the present disclosure.

The term plasticizer refers to a substance that is added to a material in order to make the material softer, more flexible (by decreasing the glass-transition temperature Tg) and easier to process.

Component (iii) can also be any mixture of the above-mentioned compounds.

In one embodiment, component (iii) is present in an amount of 0.5 to 50 wt.-%, preferably 2.5 to 25 wt.-%, more preferably 3 to 15 wt.-%, based on the dry weight of component (i).

In a further embodiment of the binder used with the disclosure an aqueous binder composition comprising component (i) and an alternative component (iia) is described in the following.

In one embodiment an aqueous binder composition for mineral fibres comprises:
  a component (i) in form of one or more oxidized lignins;
  a component (iia) in form of one or more modifiers.

The excellent binder properties can also be achieved by a two-component system which comprises component (i) in form of one or more oxidized lignins and a component (iia) in form of one or more modifiers, and optionally any of the other components mentioned above and below.

In an embodiment, the component (iia) is a modifier in form of one or more compounds selected from the group consisting of epoxidized oils based on fatty acid triglycerides.

In one embodiment, the component (iia) is a modifier in form of one or more compounds selected from molecules having three or more epoxy groups.

In one embodiment, the component (iia) is a modifier in form of one or more flexible oligomer or polymer, such as a low $T_g$ acrylic based polymer, such as a low $T_g$ vinyl based polymer, such as low $T_g$ polyether, which contains reactive functional groups such as carbodiimide groups, such as anhydride groups, such as oxazoline groups, such as amino groups, such as epoxy groups.

In one embodiment, component (iia) is one or more modifiers selected from the group consisting of polyethylene imine, polyvinyl amine, fatty amines.

In one embodiment, the component (iia) is one or more modifiers selected from aliphatic multifunctional carbodiimides.

Component (iia) can also be any mixture of the above-mentioned compounds.

Without wanting to be bound by any particular theory, he excellent binder properties achieved by the binder composition for mineral fibres comprising component (i) and (iia), and optional further components, are at least partly due to the effect that the modifiers used as components (iia) at least partly serve the function of a plasticizer and a cross-linker.

In one embodiment, the aqueous binder composition comprises the component (iia) in an amount of 1 to 40 wt.-%, such as 4 to 20 wt.-%, such as 6 to 12 wt.-%, based on the dry weight of component (i).

Further Components

In some embodiments, the aqueous binder composition used with the present disclosure comprises further components.

In one embodiment, the aqueous binder composition used with the present disclosure comprises a catalyst selected from inorganic acids, such as sulfuric acid, sulfamic acid, nitric acid, boric acid, hypophosphorous acid, and/or phosphoric acid, and/or any salts thereof such as sodium hypophosphite, and/or ammonium salts, such as ammonium salts of sulfuric acid, sulfamic acid, nitric acid, boric acid, hypophosphorous acid, and/or phosphoric acid. The presence of such a catalyst can improve the curing properties of the aqueous binder composition used with the present disclosure.

In one embodiment, the aqueous binder composition used with the present disclosure comprises a catalyst selected from Lewis acids, which can accept an electron pair from a donor compound forming a Lewis adduct, such as $ZnCl_2$, $Mg(ClO_4)_2$, $Sn[N(SO_2\text{-}n\text{-}C_8F_{17})_2]_4$.

In one embodiment, the aqueous binder composition used with the present disclosure comprises a catalyst selected from metal chlorides, such as $KCl$, $MgCl_2$, $ZnCl_2$, $FeCl_3$ and $SnCl_2$.

In one embodiment, the aqueous binder composition used with the present disclosure comprises a catalyst selected from organometallic compounds, such as titanate-based catalysts and stannum based catalysts.

In one embodiment, the aqueous binder composition used with the present disclosure comprises a catalyst selected from chelating agents, such as transition metals, such as iron ions, chromium Ions, manganese ions, copper ions.

In one embodiment, the aqueous binder composition used with the present disclosure further comprises a further component (iv) in form of one or more silanes.

In one embodiment, the aqueous binder composition used with the present disclosure comprises a further component (iv) in form of one or more coupling agents, such as organofunctional silanes.

In one embodiment, component (iv) is selected from group consisting of organofunctional silanes, such as primary or secondary amino functionalized silanes, epoxy functionalized silanes, such as polymeric or oligomeric epoxy functionalized silanes, methacrylate functionalized silanes, alkyl and aryl functionalized silanes, urea functionalized silanes or vinyl functionalized silanes.

In one embodiment, the aqueous binder composition used with the present disclosure further comprises a component (v) in form of one or more components selected from the group of ammonia, amines or any salts thereof.

It has been found that the inclusion of ammonia, amines or any salts thereof as a further component (v) can in particular be useful when oxidized lignins are used in the component (i), which oxidized lignin have not been oxidized in the presence of ammonia.

In one embodiment, the aqueous binder composition used with the present disclosure further comprises a further component in form of urea, in particular in an amount of 5 to 40 wt.-%, such as 10 to 30 wt.-%, 15 to 25 wt.-%, based on the dry weight of the component (i).

In one embodiment, the aqueous binder composition used with the present disclosure further comprises a further component in form of one or more carbohydrates selected from the group consisting of sucrose, reducing sugars, in particular dextrose, polycarbohydrates, and mixtures thereof, preferably dextrins and maltodextrins, more preferably glucose syrups, and more preferably glucose syrups with a dextrose equivalent value of DE=30 to less than 100, such as DE=60 to less than 100, such as DE=60 to 99, such as DE=85 to 99, such as DE=95 to 99.

In one embodiment, the aqueous binder composition used with the present disclosure further comprises a further component in form of one or more carbohydrates selected from the group consisting of sucrose and reducing sugars in an amount of 5 to 50 wt.-%, such as 5 to less than 50 wt.-%, such as 10 to 40 wt.-%, such as 15 to 30 wt.-% based on the dry weight of component (i).

In the context with a binder used with the present disclosure, the binder composition having a sugar content of 50 wt.-% or more, based on the total dry weight of the binder components, is considered to be a sugar-based binder. A binder composition having a sugar content of less than 50 wt.-% based on the total dry weight of the binder components, is considered a non-sugar-based binder.

In one embodiment, the aqueous adhesive composition used with the present disclosure further comprises a further component in form of one or more surface active agents that are in the form of non-ionic and/or ionic emulsifiers such as polyoxyethylene (4) lauryl ether, such as soy lecithin, such as sodium dodecyl sulfate.

In one embodiment, the aqueous binder composition used with the present disclosure comprises
  a component (i) in form of one or more ammonia-oxidized lignins having a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component (i);
  a component (ii) in form of one or more cross-linkers selected from β-hydroxyalkylamide-cross-linkers and/or oxazoline-cross-linkers and/or is one or more cross-linkers selected from the group consisting of multifunctional organic amines such as an alkanolamine, diannines, such as hexamethyldiamine, triamines;
  a component (iii) in form of one or more polyethylene glycols having an average molecular weight of 150 to 50000 g/mol, in particular 150 to 4000 g/mol, more particular 150 to 1000 g/mol, preferably 150 to 500 g/mol, more preferably 150 to 300 g/mol, or one or more polyethylene glycols having an average molecular weight of 4000 to 25000 g/mol, in particular 4000 to 15000 g/mol, more particular 8000 to 12000 g/mol; wherein preferably the aqueous binder composition comprises component (ii) in an amount of 1 to 40 wt.-%, such as 4 to 20 wt.-%, 6 to 12 wt.-%, based on the dry weight of component (i), and component (iii) is present in an amount of 0.5 to 50 wt.-%, preferably 2.5 to 25 wt.-%, more preferably 3 to 15 wt.-%, based on the dry weight of component (i).

In one embodiment, the aqueous binder composition used with the present disclosure comprises
  a component (i) in form of one or more ammonia-oxidized lignins having a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component (i);
  a component (ii) in form of one or more modifiers selected from epoxidized oils based on fatty acid triglycerides.

In one embodiment, the aqueous binder composition used with the present disclosure comprises
  a component (i) in form of one or more ammonia-oxidized lignins having an average carboxylic acid group content of more than 1.5 groups per macromolecule of the first component, such as more than 2 groups, such as more than 2.5 groups;
  a component (ii) in form of on or more cross-linkers selected from β-hydroxyalkylamide-cross-linkers and/or oxazoline-cross-linkers and/or is one or more cross-linkers selected from the group consisting of multifunctional organic amines such as an alkanolamine, diamines, such as hexamethyldiamine, triamines;
  a component (iii) in form of one or more polyethylene glycols having an average molecular weight of 150 to 50000 g/mol, in particular 150 to 4000 g/mol, more particular 150 to 1000 g/mol, preferably 150 to 500 g/mol, more preferably 150 to 300 g/mol, or one or more polyethylene glycols having an average molecular weight of 4000 to 25000 g/mol, in particular 4000 to 15000 g/mol, more particular 8000 to 12000 g/mol; wherein preferably the aqueous binder composition comprises component (ii) in an amount of 1 to 40 wt.-%, such as 4 to 20 wt.-%, 6 to 12 wt.-%, based on the dry weight of component (i) and component (iii) is present in an amount of 0.5 to 50 wt.-%, preferably 2.5 to 25 wt.-%, more preferably 3 to 15 wt.-%, based on the dry weight of component (i).

In one embodiment, the aqueous binder composition used with the present disclosure comprises
  a component (i) in form of one or more ammonia-oxidized lignins having an average carboxylic acid group content of more than 1.5 groups per macromolecule of component (i), such as more than 2 groups, such as more than 2.5 groups;

a component (iia) in form of one or more modifiers selected from epoxidized oils based on fatty acid triglycerides.

In one embodiment, the aqueous binder composition used with the present disclosure consists essentially of
 a component (i) in form of one or more oxidized lignins;
 a component (ii) in form of one or more cross-linkers;
 a component (iii) in form of one or more plasticizers;
 a component (iv) in form of one or more coupling agents, such as organofunctional silanes;
 optionally a component in form of one or more compounds selected from the group of ammonia, amines or any salts thereof;
 optionally a component in form of urea;
 optionally a component in form of a more reactive or non-reactive silicones;
 optionally a hydrocarbon oil;
 optionally one or more surface active agents;
 water.

In one embodiment, the aqueous binder composition used with the present disclosure consists essentially of
 a component (i) in form of one or more oxidized lignins;
 a component (iia) in form of one or more modifiers selected from epoxidized oils based on fatty acid triglycerides;
 a component (iv) in form of one or more coupling agents, such as organofunctional silanes;
 optionally a component in form of one or more compounds selected from the group of ammonia, amines or any salts thereof;
 optionally a component in form of urea;
 optionally a component in form of a more reactive or non-reactive silicones;
 optionally a hydrocarbon oil;
 optionally one or more surface active agents;
 water.

Preparation of the Ammonia Oxidized Lignin (AOL) Resin 3267 kg of water is charged in 6000 l reactor followed by 287 kg of ammonia water (24.7%). Then 1531 kg of Lignin UPM BioPiva 100 is slowly added over a period of 30 min to 45 min. The mixture is heated to 40° C. and kept at that temperature for 1 hour. After 1 hour is a check made on insolubilized lignin. This can be made by checking the solution on a glass plate or a Hegman gauge. Insolubilized lignin is seen as small particles in the brown binder. During the dissolution step will the lignin solution change color from brown to shiny black.

After the lignin is completely dissolved, 1 liter of a foam dampening agent (Skumdæmper 11-10 from NCÅ-Verodan) is added. Temperature of the batch is maintained at 40° C.

Then addition of 307.5 kg 35% hydrogen peroxide is started. The hydrogen peroxide is dosed at a rate of 200 to 300 liter/hour. First half of the hydrogen peroxide is added at a rate of 200 l/h where after the dosage rate is increased to 300 liter/hour.

During the addition of hydrogen peroxide is the temperature in the reaction mixture controlled by heating or cooling in such a way that a final reaction temperature of 65° C. is reached.

After 15 min reaction at 65° C. is the reaction mixture cooled to a temperature below 50° C. Hereby is a resin obtained having a COOH value of 1.2 mmol/g solids.

Final Binder Preparation

From the above-mentioned AOL resin a binder was formulated by addition of 270 kg polyethylene glycol 200 and 433 kg of a 31% solution of Primid XL-552 in water.

Primid XL552 has the following structure:

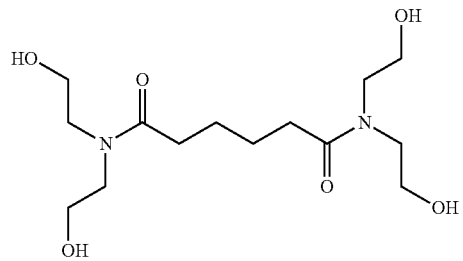

Primid XL-552

Analysis of the Final Binder Showed the Following Data
 Solids content: 18.9% pH: 9.7
 Viscosity: 25.5 mPa·s
 Density: 1.066 kg/l Oxidized Lignins Which Can Be Used as Component in the Aqueous Binder Composition for Mineral Fibres According to the Present Disclosure and Method for Preparing Such Oxidized Lignins In the following, oxidized lignins are described which can be used as component of the binder composition and their preparation.

Method I to Prepare Oxidized Lignins

Oxidized lignins, which can be used as component for the binders used in the present disclosure can be prepared by a method comprising bringing into contact
 a component (a) comprising one or more lignins
 a component (b) comprising ammonia, one or more amine components, and/or any salt thereof.
 a component (c) comprising one or more oxidation agents.

Component (a)

Component (a) comprises one or more lignins.

In one embodiment of the method according to the present disclosure, component (a) comprises one or more kraft lignins, one or more soda lignins, one or more lignosulfonate lignins, one or more organosolv lignins, one or more lignins from biorefining processes of lignocellulosic feedstocks, or any mixture thereof.

In one embodiment, component (a) comprises one or more kraft lignins.

Component (b)

In one embodiment according to the present disclosure, component (b) comprises ammonia, one or more amino components, and/or any salts thereof. Without wanting to be bound by any particular theory, the present inventors believe that replacement of the alkali hydroxides used in previously known oxidation processes of lignin by ammonia, one or more amino components, and/or any salts thereof, plays an important role in the improved properties of the oxidized lignins prepared according to the method of the present disclosure.

The present inventors have surprisingly found that the lignins oxidized by an oxidation agent in the presence of ammonia or amines contain significant amounts of nitrogen as a part of the structure of the oxidized lignins. Without wanting to be bound to any particular theory, the present inventors believe that the improved fire resistance properties of the oxidized lignins when used in products where they are comprised in a binder composition, said oxidized lignins prepared by the method according to the present disclosure, are at least partly due to the nitrogen content of the structure of the oxidized lignins.

In one embodiment, component (b) comprises ammonia and/or any salt thereof.

Without wanting to be bound by any particular theory, the present inventors believe that the improved stability properties of the derivatized lignins prepared according to the present disclosure are at least partly due to the fact that ammonia is a volatile compound and therefore evaporates from the final product or can be easily removed and reused. In contrast to that, it has proven difficult to remove residual amounts of the alkali hydroxides used in the previously known oxidation process.

Nevertheless, it can be advantageous in the method according to the present disclosure that component (b), besides ammonia, one or more amino components, and/or any salts thereof, also comprises a comparably small amount of an alkali and/or earth alkali metal hydroxide, such as sodium hydroxide and/or potassium hydroxide.

In the embodiments, in which component (b) comprises alkali and/or earth alkali metal hydroxides, such as sodium hydroxide and/or potassium hydroxide, as a component in addition to the ammonia, one or more amino components, and/or any salts thereof, the amount of the alkali and/or earth alkali metal hydroxides is usually small, such as 5 to 70 weight parts, such as 10 to 20 weight parts alkali and/or earth alkali metal hydroxide, based on ammonia.

Component (c)

In the method according to the present disclosure, component (c) comprises one or more oxidation agents.

In one embodiment, component (c) comprises one or more oxidation agents in form of hydrogen peroxide, organic or inorganic peroxides, molecular oxygen, ozone, air, halogen containing oxidation agents, or any mixture thereof.

In the initial steps of the oxidation, active radicals from the oxidant will typically abstract the proton from the phenolic group as that bond has the lowest dissociation energy in lignin. Due to lignin's potential to stabilize radicals through mesomerism multiple pathways open up to continue (but also terminate) the reaction and various intermediate and final products are obtained. The average molecular weight can both increase and decrease due to this complexity (and chosen conditions) and in their experiments, the inventors have typically seen moderate increase of average molecular weight of around 30%.

In one embodiment, component (c) comprises hydrogen peroxide.

Hydrogen peroxide is perhaps the most commonly employed oxidant due to combination of low price, good efficiency and relatively low environmental impact. When hydrogen peroxide is used without the presence of catalysts, alkaline conditions and temperature are important due to the following reactions leading to radical formation:

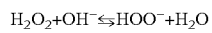

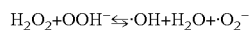

The present inventors have found that the derivatized lignins prepared with the method according to the present disclosure contain increased amounts of carboxylic acid groups as a result of the oxidation process. Without wanting to be bound by any particular theory, the present inventors believe that the carboxylic acid group content of the oxidized lignins prepared in the process according to the present disclosure plays an important role in the desirable reactivity properties of the derivatized lignins prepared by the method according to the present disclosure.

Another advantage of the oxidation process is that the oxidized lignin is more hydrophilic. Higher hydrophilicity can enhance solubility in water and facilitate the adhesion to polar substrates such as mineral fibres.

Further Components

In one embodiment, the method according to the present disclosure comprises further components, in particular a component (d) in form of an oxidation catalyst, such as one or more transition metal catalyst, such as iron sulfate, such as manganese, palladium, selenium, tungsten containing catalysts.

Such oxidation catalysts can increase the rate of the reaction, thereby improving the properties of the oxidized lignins prepared by the method according to the present disclosure.

Mass Ratios of the Components

The person skilled in the art will use the components (a), (b) and (c) in relative amounts that the desired degree of oxidation of the lignins is achieved.

In one embodiment,
a component (a) comprises one or more lignins
a component (b) comprises ammonia
a component (c) comprises one or more oxidation agents
  in form of hydrogen peroxide,
wherein the mass ratios of lignin, ammonia and hydrogen peroxide are such that the amount of ammonia is 0.01 to 0.5 weight parts, such as 0.1 to 0.3 weight parts, such as 0.15 to 0.25 weight parts ammonia, based on the dry weight of lignin, and wherein the amount of hydrogen peroxide is 0.025 to 1.0 weight parts, such as 0.05 to 0.2 weight parts, such as 0.075 to 0.125 weight parts hydrogen peroxide, based on the dry weight of lignin.

Process

There is more than one possibility to bring the components (a), (b) and (c) in contact to achieve the desired oxidation reaction.

In one embodiment, the method comprises the steps of:
  a step of providing component (a) in form of an aqueous solution and/or dispersion of one more lignins, the lignin content of the aqueous solution being 1 to 50 wt.-%, such as 5 to 25 wt.-%, such as 15 to 22 wt.-%, such as 18 to 20 wt.-%, based on the total weight of the aqueous solution;
  a pH adjusting step by adding component (b) comprising an aqueous solution of ammonia, one or more amine components, and/or any salt thereof;
  an oxidation step by adding component (c) comprising an oxidation agent.

In one embodiment, the pH adjusting step is carried so that the resulting aqueous solution and/or dispersion is having a pH≥9, such as ≥10, such as ≥10.5.

In one embodiment, the pH adjusting step is carried out so that the resulting aqueous solution and/or dispersion is having a pH in the range of 10.5 to 12.

In one embodiment, the pH adjusting step is carried out so that the temperature is allowed to raise to ≥25° C. and then controlled in the range of 25 to 50° C., such as 30 to 45° C., such as 35 to 40° C.

In one embodiment, during the oxidation step, the temperature is allowed to raise ≥35° C. and is then controlled in the range of 35 to 150° C., such as 40 to 90° C., such as 45 to 80° C.

In one embodiment, the oxidation step is carried out for a time of 1 second to 48 hours, such as 10 seconds to 36 hours, such as 1 minute to 24 hours such as 2 to 5 hours.

Method II to Prepare Oxidized Lignins

Oxidized lignins, which can be used as component for the binders used in the present disclosure can be prepared by a method comprising bringing into contact

- a component (a) comprising one or more lignins
- a component (b) comprising ammonia and/or one or more amine components, and/or any salt thereof and/or an alkali and/or earth alkali metal hydroxide, such as sodium hydroxide and/or potassium hydroxide
- a component (c) comprising one or more oxidation agents
- a component (d) in form of one or more plasticizers.

Component (a)

Component (a) comprises one or more lignins.

In one embodiment of the method according to the present disclosure, component (a) comprises one or more kraft lignins, one or more soda lignins, one or more lignosulfonate lignins, one or more organosolv lignins, one or more lignins from biorefining processes of lignocellulosic feedstocks, or any mixture thereof.

In one embodiment, component (a) comprises one or more kraft lignins.

Component (b)

In one embodiment according to the present disclosure, component (b) comprises ammonia, one or more amino components, and/or any salts thereof and/or an alkali and/or earth alkali metal hydroxide, such as sodium hydroxide and/or potassium hydroxide.

"Ammonia-oxidized lignins" is to be understood as a lignin that has been oxidized by an oxidation agent in the presence of ammonia. The term "ammonia-oxidized lignin" is abbreviated as AOL.

In one embodiment, component (b) comprises ammonia and/or any salt thereof.

Without wanting to be bound by any particular theory, the present inventors believe that the improved stability properties of the derivatized lignins prepared according to the present disclosure with component (b) being ammonia and/or any salt thereof are at least partly due to the fact that ammonia is a volatile compound and therefore evaporates from the final product or can be easily removed and reused.

Nevertheless, it can be advantageous in this embodiment of the method according to the present disclosure that component (b), besides ammonia, one or more amino components, and/or any salts thereof, also comprises a comparably small amount of an alkali and/or earth alkali metal hydroxide, such as sodium hydroxide and/or potassium hydroxide.

In the embodiments, in which component (b) comprises alkali and/or earth alkali metal hydroxides, such as sodium hydroxide and/or potassium hydroxide, as a component in addition to the ammonia, one or more amino components, and/or any salts thereof, the amount of the alkali and/or earth alkali metal hydroxides is usually small, such as 5 to 70 weight parts, such as 10 to 20 weight parts alkali and/or earth alkali metal hydroxide, based on ammonia.

Component (c)

In the method according to the present disclosure, component (c) comprises one or more oxidation agents.

In one embodiment, component (c) comprises one or more oxidation agents in form of hydrogen peroxide, organic or inorganic peroxides, molecular oxygen, ozone, air, halogen containing oxidation agents, or any mixture thereof.

In the initial steps of the oxidation, active radicals from the oxidant will typically abstract the proton from the phenolic group as that bond has the lowest dissociation energy in lignin. Due to lignin's potential to stabilize radicals through mesomerism, multiple pathways open up to continue (but also terminate) the reaction and various intermediate and final products are obtained. The average molecular weight can both increase and decrease due to this complexity (and chosen conditions) and in their experiments, the inventors have typically seen moderate increase of average molecular weight of around 30%.

In one embodiment, component (c) comprises hydrogen peroxide.

Hydrogen peroxide is perhaps the most commonly employed oxidant due to combination of low price, good efficiency and relatively low environmental impact. When hydrogen peroxide is used without the presence of catalysts, alkaline conditions and temperature are important due to the following reactions leading to radical formation:

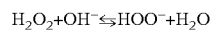

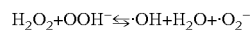

The present inventors have found that the derivatized lignins prepared with the method according to the present disclosure contain increased amounts of carboxylic acid groups as a result of the oxidation process. Without wanting to be bound by any particular theory, the present inventors believe that the carboxylic acid group content of the oxidized lignins prepared in the process according to the present disclosure plays an important role in the desirable reactivity properties of the derivatized lignins prepared by the method according to the present disclosure.

Another advantage of the oxidation process is that the oxidized lignin is more hydrophilic. Higher hydrophilicity can enhance solubility in water and facilitate the adhesion to polar substrates such as mineral fibres.

Component (d)

Component (d) comprises one or more plasticizers.

In one embodiment according to the present disclosure, component (d) comprises one or more plasticizers in form of polyols, such as carbohydrates, hydrogenated sugars, such as sorbitol, erythriol, glycerol, monoethylene glycol, polyethylene glycols, polyethylene glycol ethers, polyethers, phthalates and/or acids, such as adipic acid, vanillic acid, lactic acid and/or ferullic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups, polyamides, amides such as carbamide/urea., or any mixtures thereof.

The present inventors have found that the inclusion of component (d) in form of one or more plasticizers provides a decrease of the viscosity of the reaction mixture which allows a very efficient method to produce oxidized lignins.

In one embodiment according to the present disclosure, component (d) comprises one or more plasticizers in form of polyols, such as carbohydrates, hydrogenated sugars, such as sorbitol, erythriol, glycerol, monoethylene glycol, polyethylene glycols, polyvinyl alcohol, acrylic based polymers with free carboxy groups and/or polyurethane dispersions with free carboxy groups, polyamides, amides such as carbamide/urea, or any mixtures thereof.

In one embodiment according to the present disclosure, component (d) comprises one or more plasticizers selected from the group of polyethylene glycols, polyvinyl alcohol, urea or any mixtures thereof.

Further Components

In one embodiment, the method according to the present disclosure comprises further components, in particular a component (v) in form of an oxidation catalyst, such as one or more transition metal catalyst, such as iron sulfate, such as manganese, palladium, selenium, tungsten containing catalysts.

Such oxidation catalysts can increase the rate of the reaction, thereby improving the properties of the oxidized lignins prepared by the method.

Mass Ratios of the Components

The person skilled in the art will use the components (a), (b), (c), and (d) in relative amounts that the desired degree of oxidation of the lignins is achieved.

In one embodiment, the method according to the present disclosure is carried out such that the method comprises
  a component (a) comprises one or more lignins
  a component (b) comprises ammonia
  a component (c) comprises one more oxidation agents in form of hydrogen peroxide,
  a component (d) comprises one or more plasticizers selected from the group of polyethylene glycol,
wherein the mass ratios of lignin, ammonia, hydrogen peroxide and polyethylene glycol are such that the amount of ammonia is 0.01 to 0.5 weight parts, such as 0.1 to 0.3 weight parts, such as 0.15 to 0.25 weight parts ammonia (25 wt.-% solution in water), based on the dry weight of lignin, and wherein the amount of hydrogen peroxide (30 wt.-% solution in water) is 0.025 to 1.0 weight parts, such as 0.07 to 0.50 weight parts, such as 0.15 to 0.30 weight parts hydrogen peroxide, based on the dry weight of lignin, and wherein the amount of polyethylene glycol is 0.03 to 0.60 weight parts, such as 0.07 to 0.50 weight parts, such as 0.10 to 0.40 weight parts polyethylene glycol, based on the dry weight of lignin.

For the purpose of the present disclosure, the "dry weight of lignin" is preferably defined as the weight of the lignin in the supplied form.

Process

There is more than one possibility to bring the components (a), (b), (c), and (d) in contact to achieve the desired oxidation reaction.

In one embodiment, the method comprises the steps of:
  a step of providing component (a) in form of an aqueous solution and/or dispersion of one more lignins, the lignin content of the aqueous solution being 5 to 90 wt.-%, such as 10 to 85 wt.-%, such as 15 to 70 wt.-%, based on the total weight of the aqueous solution;
  a pH adjusting step by adding component (b);
  a step of adding component (d);
  an oxidation step by adding component (c) comprising an oxidation agent.

In one embodiment, the pH adjusting step is carried so that the resulting aqueous solution and/or dispersion is having a pH ≥9, such as ≥10, such as ≥10.5.

In one embodiment, the pH adjusting step is carried out so that the resulting aqueous solution and/or dispersion is having a pH in the range of 9.5 to 12.

In one embodiment, the pH adjusting step is carried out so that the temperature is allowed to raise to ≥25° C. and then controlled in the range of 25 to 50° C., such as 30 to 45° C., such as 35 to 40° C.

In one embodiment, during the oxidation step, the temperature is allowed to raise to ≥35° C. and is then controlled in the range of 35 to 150° C., such as 40 to 90° C., such as 45 to 80° C.

In one embodiment, the oxidation step is carried out for a time of 1 seconds to 24 hours, such as 1 minutes to 12 hours, such as 10 minutes to 8 hours, such as 5 minutes to 1 hour.

The present inventors have found that the process according to the present disclosure allows to produce a high dry matter content of the reaction mixture and therefore a high throughput is possible in the process according to the present disclosure which allows the reaction product in form of the oxidized lignins to be used as a component in industrial mass production products such as mineral fibre products.

In one embodiment, the method according to the present disclosure is carried out such that the dry matter content of the reaction mixture is 20 to 80 wt. %, such as 40 to 70 wt. %.

In one embodiment, the method according to the present disclosure is carried out such that the viscosity of the oxidized lignin has a value of 100 cP to 100.000 cP, such as a value of 500 cP to 50.000 cP, such as a value of 1.000 cP to 25.000 cP.

For the purpose of the present disclosure, viscosity is dynamic viscosity and is defined as the resistance of the liquid/paste to a change in shape, or movement of neighbouring portions relative to one another. The viscosity is measured in centipoise (cP), which is the equivalent of 1 mPa s (millipascal second). Viscosity is measured at 20° C. using a viscometer. For the purpose of the present disclosure, the dynamic viscosity can be measured at 20° C. by a Cone Plate Wells Brookfield Viscometer.

In one embodiment, the method according to the present disclosure is carried out such that the method comprises a rotator-stator device.

In one embodiment, the method according to the present disclosure is carried out such that the method is performed as a continuous or semi-continuous process.

Apparatus for Performing the Method

The present disclosure is also directed to an apparatus for performing the method described above.

In one embodiment, the apparatus for performing the method comprises:
  a rotor-stator device,
  a premixing device for component (a), (b), (d)
  one or more inlets for water, components (a), (b), (c) and (d),
  one or more outlets for an oxidized lignin.

In one embodiment, the apparatus is constructed in such a way that the inlets for the premix of the components (a), (b) and (d) are to the rotor-stator device and the apparatus furthermore comprises a chamber, said chamber having an inlet for component (c) and said chamber having an outlet for an oxidized lignin.

A rotator-stator device is a device for processing materials comprising a stator configured as an inner cone provided with gear rings. The stator cooperates with a rotor having arms projecting from a hub. Each of these arms bears teeth meshing with the teeth of the gear rings of the stator. With each turn of the rotor, the material to be processed is transported farther outward by one stage, while being subjected to an intensive shear effect, mixing and redistribution. The rotor arm and the subjacent container chamber of the upright device allow for a permanent rearrangement of the material from the inside to the outside and provide for a multiple processing of dry and/or highly viscous matter so that the device is of excellent utility for the intensive mixing, kneading, fibrillating, disintegrating and similar processes important in industrial production. The upright arrangement of the housing facilitates the material's falling back from the periphery toward the centre of the device.

In one embodiment, the rotator-stator device used in the method according to the present disclosure comprises a stator with gear rings and a rotor with teeth meshing with the teeth of the stator. In this embodiment, the rotator-stator device has the following features: Between arms of the rotor protrudes a guiding funnel that concentrates the material flow coming in from above to the central area of the container. The outer surface of the guiding funnel defines an annular gap throttling the material flow. At the rotor, a feed screw is provided that feeds towards the working region of the device. The guiding funnel retains the product in the active region of the device and the feed screw generates an increased material pressure in the centre.

For more details of the rotator-stator device to be used in one embodiment of the method, reference is made to US 2003/0042344 A1, which is incorporated by reference.

In one embodiment, the method is carried out such that the method uses one rotator-stator device. In this embodiment, the mixing of the components and the reaction of the components is carried out in the same rotator-stator device.

In one embodiment, the method is carried out such that the method uses two or more rotator-stator devices, wherein at least one rotator-stator device is used for the mixing of the components and at least one rotator-stator device is used for reacting the components.

This process can be divided into two steps:
1. Preparation of the Lignin mass (a)+(b)+(d)
2. Oxidization of the lignin mass Typically, two different types of rotor-/stator machines are used:
1. Open rotor-/stator machine suitable for blending in the lignin powder into water on a very high concentration (30 to 50 wt.-%). Less intensive mixing but special auxiliaries (inlet funnel, screw etc.) to handle highly viscous materials. Lower circumferential speed (up to 15 m/s). The machine can be used as batch system or continuous.
2. Inline rotor-/stator machine which has much higher shear forces—circumferential speeds of up to 55 m/s)—and creates beneficial conditions for a very quick chemical reaction. The machine is to be used continuously.

In the open rotor-/stator system the highly concentrated (45 to 50 wt.-%) mass of Lignin/water is prepared. The lignin powder is added slowly to the warm water (30 to 60° C.) in which the correct amount of watery ammonia and/or alkali base have been added. This can be done in batch mode, or the materials are added intermittently/continuously creating a continuous flow of mass to the next step.

The created mass should be kept at a temperature of about 60° C. to keep the viscosity as low as possible and hence the material pumpable. The hot mass of lignin/water at a pH of 9 to 12 is then transferred using a suitable pump, e.g. progressive cavity pump or another volumetric pump, to the oxidation step.

In on embodiment the oxidation is done in a closed rotor-/stator system in a continuous inline reaction. A watery solution of ammonia and/or alkali base is dosed with a dosing pump into the rotor-/stator chamber at the point of highest turbulence/shear. This ensures a rapid oxidation reaction. The oxidized material
Reaction Product The present inventors have surprisingly found, that the oxidized lignins prepared have very desirable reactivity properties and at the same time display improved fire resistance properties when used in products where they are comprised in a binder composition, and improved long-term stability over previously known oxidized lignins.

The oxidized lignin also displays improved hydrophilicity.

An important parameter for the reactivity of the oxidized lignins prepared is the carboxylic acid group content of the oxidized lignins.

In one embodiment, the oxidized lignin prepared has a carboxylic acid group content of 0.05 to 10 mmol/g, such as 0.1 to 5 mmol/g, such as 0.20 to 2.0 mmol/g, such as 0.40 to 1.5 mmol/g, such as 0.45 to 1.0 mmol/g, based on the dry weight of component (a).

Another way to describe the carboxylic acid group content is by using average carboxylic acid group content per lignin macromolecule according to the following formula:

$$\text{Average COOH functionality} = \frac{\text{total moles COOH}}{\text{total moles lignin}}$$

In one embodiment, the oxidized lignin prepared has an average carboxylic acid group content of more than 1.5 groups per macromolecule of component (a), such as more than 2 groups, such as more than 2.5 groups.

Method III to Prepare Oxidized Lignins

Oxidized lignins, which can be used as a component for the binder used in the present disclosure can be prepared by a method comprising bringing into contact
- a component (a) comprising one or more lignins,
- a component (b) comprising ammonia and/or one or more amine components, and/or any salt thereof and/or an alkali and/or earth alkali metal hydroxide, such as sodium hydroxide and/or potassium hydroxide,
- a component (c) comprising one or more oxidation agents,
- optionally a component (d) in form of one or more plasticizers, and allowing a mixing/oxidation step, wherein an oxidized mixture is produced, followed by an oxidation step, wherein the oxidized mixture is allowed to continue to react for a dwell time of dwell time of 1 second to 10 hours, such as 10 seconds to 6 hours, such as 30 seconds to 2 hours.

Components (a), (b), (c) and (d) are as defined above under method II to prepare oxidized lignins.

In one embodiment of the disclosure, the process comprises a premixing step in which components are brought into contact with each other.

In the premixing step the following components can be brought into contact with each other:
component (a) and component (b), or
component (a) and component (b) and component (c), or
component (a) and component (b) and component (d), or
component (a) and component (b) and component (c) and component (d).

In an embodiment of the disclosure, it is possible that the premixing step is carried out as a separate step and the mixing/oxidation step is carried out subsequently to the premixing step. In such an embodiment of the disclosure it is particularly advantageous to bring component (a) and component (b) and optionally component (d) into contact with each other in a premixing step. In a subsequent mixing/oxidation step, component (c) is then added to the premixture produced in the premixing step.

In another example of the disclosure, it is possible that the premixing step corresponds to the mixing/oxidation step. In this embodiment of the disclosure, the components, for example component (a), component (b) and component (c) are mixed and an oxidation process is started at the same time. It is possible that the subsequent dwell time is performed in the same device as that used to perform the mixing/oxidation step. Such an implementation of the disclosure is particularly advantageous if component (c) is air.

The present inventors have found out that by allowing a mixing/oxidation step followed by an oxidation step, in which the reaction mixture is preferably not continued to be mixed, the oxidation rate can be controlled in a very efficient manner. At the same time, the costs for performing the method are reduced because the oxidation step subsequent to the mixing/oxidation step requires less complex equipment.

Another advantage is that oxidized lignin, which is produced is particularly stable. Another surprising advantage is that the oxidized lignin produced is very well adjustable in terms of viscosity. Another surprising advantage is that the concentration of the oxidized lignin can be very high.

In one embodiment, the dwell time is so chosen that the oxidation reaction is brought to the desired degree of completion, preferably to full completion.

System I for Performing the Method III

In one embodiment, the system for performing the method comprises:
- at least one rotor-stator device,
- one or more inlets for water and components (a) and (b),
- one or more outlets of the rotor-stator device,
- at least one reaction device, in particular at least one reaction tube, which is arranged downstream in the process flow direction to at least one or more of the outlets.

In one embodiment, the system comprises one or more inlets for component (c) and/or component (d).

In one embodiment, the system comprises a premixing device.

The premixing device can comprise one or more inlets for water and/or component (a) and/or component (b) and/or component (c) and/or component (d).

In one embodiment of the disclosure, the premixing device comprises inlets for water and component (a) and component (b).

It is possible that, in a premixing step, component (c) is also mixed with the three mentioned ingredients (water, component (a) and component (b)). It is then possible that the premixing device has a further inlet for component (c). If component (c) is air, it is possible that the premixing device is formed by an open mixing vessel, so that in this case component (c) is already brought into contact with the other components (water, component (a) and component (b)) through the opening of the vessel. Also, in this embodiment of the disclosure, it is possible that the premixing device optionally comprises an inlet for component (d).

In one embodiment, the system is constructed in such a way that the inlets for components (a), (b) and (d) are inlets of a premixing device, in particular of an open rotor-stator device, whereby the system furthermore comprises an additional rotor-stator device, said additional rotor-stator device having an inlet for component (c) and said additional rotor-stator device having an outlet for an oxidized lignin.

It is possible that the premixing step and the mixing/oxidizing step are carried out simultaneously. In this case, the premixing device and the mixing/oxidizing device are a single device, i. e. a rotor-stator device.

In one embodiment, one rotator-stator device used in the method according to the present disclosure comprises a stator with gear rings and a rotor with teeth meshing with the teeth of the stator. In this embodiment, the rotator-stator device has the following features: Between arms of the rotor protrudes a guiding funnel that concentrates the material flow coming in from above to the central area of the container. The outer surface of the guiding funnel defines an annular gap throttling the material flow. At the rotor, a feed screw is provided that feeds towards the working region of the device. The guiding funnel retains the product in the active region of the device and the feed screw generates an increased material pressure in the centre.

System II for Performing the Method III

In one embodiment, the system for performing the method comprises:
- one or more inlets for water, components (a) and (b),
- at least one mixing and oxidizing apparatus with one or more outlets, and
- at least one mixer/heat-exchanger, which is arranged downstream in the process flow direction to the at least one or more of the outlets, whereby the mixer/heat-exchanger comprises a temperature control device.

In one embodiment, the system comprises additional one or more inlets for component (c) and/or component (d).

In one embodiment, the system comprises a premixing device.

The premixing device can comprise one or more inlets for water and/or component (a) and/or component (b) and/or component (c) and/or component (d).

In one embodiment, the premixing device comprises inlets for water and component (a) and component (b).

It is possible that, in a premixing step, component (c) is also mixed with the three mentioned ingredients (water, component (a) and component (b)). It is then possible that the premixing device has a further inlet for component (c). If component (c) is air, it is possible that the premixing device is formed by an open mixing vessel, so that in this case component (c) is already brought into contact with the other components (water, component (a) and component (b)) through the opening of the vessel. Also, in this embodiment of the disclosure, it is possible that the premixing device optionally comprises an inlet for component (d).

In one embodiment, the system is constructed in such a way that the inlets for components (a), (b) and (d) are inlets of an open rotor-stator device, whereby the system furthermore comprises a mixer/heat-exchanger, having an inlet for component (c) and an outlet for an oxidized lignin.

It is possible that the premixing step and the mixing/oxidizing step are carried out simultaneously. In this case, the premixing device and the mixing/oxidizing device are a single device.

In one embodiment, one rotator-stator device used in the method according to the present disclosure comprises a stator with gear rings and a rotor with teeth meshing with the teeth of the stator. In this embodiment, the rotator-stator device has the following features: Between arms of the rotor protrudes a guiding funnel that concentrates the material flow coming in from above to the central area of the container. The outer surface of the guiding funnel defines an annular gap throttling the material flow. At the rotor, a feed screw is provided that feeds towards the working region of the device. The guiding funnel retains the product in the active region of the device and the feed screw generates an increased material pressure in the centre.

Of course, other devices can also be used as premixing devices. Furthermore, it is possible that the premixing step is carried out in the mixing and oxidizing apparatus.

In one embodiment, the mixing and oxidizing apparatus is a static mixer. A static mixer is a device for the continuous mixing of fluid materials, without moving components. One design of static mixer is the plate-type mixer and another common device type consists of mixer elements contained in a cylindrical (tube) or squared housing.

In one embodiment, the mixer/heat-exchanger is constructed as multitube heat exchanger with mixing elements. The mixing element are preferably fixed installations through which the mixture has to flow, whereby mixing is carried out as a result of the flowing through. The mixer/heat-exchanger can be constructed as a plug flow reactor.

Examples I

Example IA—Lignin Oxidation in Ammonia Aqueous Solution by Hydrogen Peroxide

The amounts of ingredients used according to the example IA are provided in table IA 1.1 and IA 1.2.

Although kraft lignin is soluble in water at relatively high pH, it is known that at certain weight percentage the viscosity of the solution will strongly increase. It is typically believed that the reason for the viscosity increase lies in a combination of strong hydrogen bonding and interactions of 7-electrons of numerous aromatic rings present in lignin. For kraft lignin an abrupt increase in viscosity around 21-22 wt.-% in water was observed and 19 wt.-% of kraft lignin were used in the example presented.

Ammonia aqueous solution was used as base in the pH adjusting step. The amount was fixed at 4 wt.-% based on the total reaction weight. The pH after the pH adjusting step and at the beginning of oxidation was 10.7.

Table IA2 shows the results of CHNS elemental analysis before and after oxidation of kraft lignin. Before the analysis, the samples were heat treated at 160° C. to remove adsorbed ammonia. The analysis showed that a certain amount of nitrogen became a part of the structure of the oxidized lignin during the oxidation process.

During testing in batch experiments, it was determined that it is beneficial for the oxidation to add the entire amount of hydrogen peroxide during small time interval contrary to adding the peroxide in small portions over prolonged time period. In the present example 2.0 wt.-% of $H_2O_2$ based on the total reaction weight was used.

The oxidation is an exothermic reaction and increase in temperature is noted upon addition of peroxide. In this example, temperature was kept at 60° C. during three hours of reaction.

After the oxidation, the amount of lignin functional groups per gram of sample increased as determined by $^{31}P$ NMR and aqueous titration. Sample preparation for $^{31}P$ NMR was performed by using 2-chloro-4,4,5,5-tetramethyl-1,3,2-dioxaphospholane (TMDP) as phosphitylation reagent and cholesterol as internal standard. NMR spectra of kraft lignin before and after oxidation were made and the results are summarized in table IA3.

The change in COOH groups was determined by aqueous titration and utilization of the following formula:

$$C_{(COOH,mmol/g)} = \frac{(V_{2s,ml} - V_{1s,ml}) - (V_{2b,ml} - V_{1b,ml}) * C_{acid,mol/l}}{m_{s,g}}$$

Where $V_{2s}$ and $V_{1s}$ are endpoint volumes of a sample while $V_{2b}$ and $V_{1b}$ are the volume for the blank. $C_{acid}$ is 0.1M HCl in this case and $m_s$ is the weight of the sample. The values obtained from aqueous titration before and after oxidation are shown in table IA4.

The average COOH functionality can also be quantified by a saponification value which represents the number of mg of KOH required to saponify 1 g lignin. Such a method can be found in AOCS Official Method Cd 3-25.

Average molecular weight was also determined before and after oxidation with a PSS PolarSil column (9:1 (v/v) dimethyl sulphoxide/water eluent with 0.05 M LiBr) and UV detector at 280 nm. Combination of COOH concentration and average molecular weight also allowed calculating average carboxylic acid group content per lignin macromolecule and these results are shown in table IA5.

Example IB—Upscaling the Lignin Oxidation in Ammonia by Hydrogen Peroxide to Pilot Scale Lignin oxidation with hydrogen peroxide is an exothermic process and even in lab-scale significant temperature increases were seen upon addition of peroxide. This is a natural concern when scaling up chemical processes since the amount of heat produced is related to dimensions in the 3rd power (volume) whereas cooling normally only increases with dimension squared (area). In addition, due to the high viscosity of the adhesive intermediates process equipment has to be carefully selected or designed. Thus, the scale up was carefully engineered and performed in several steps.

The first scale up step was done from 1 L (lab scale) to 9 L using a professional mixer in stainless steel with very efficient mechanical mixing The scale-up resulted only in a slightly higher end temperature than obtained in lab scale, which was attributed to efficient air cooling of the reactor and slow addition of hydrogen peroxide The next scale up step was done in a closed 200 L reactor with efficient water jacket and an efficient propeller stirrer. The scale was this time 180 L and hydrogen peroxide was added in two steps with appr. 30 minutes separation. This up-scaling went relatively well, though quite some foaming was an issue partly due to the high degree reactor filling. To control the foaming a small amount of food grade defoamer was sprayed on to the foam. Most importantly the temperature controllable and end temperatures below 70° C. were obtained using external water-cooling.

The pilot scale reactions were performed in an 800 L reactor with a water-cooling jacket and a twin blade propeller stirring. 158 kg of lignin level were carefully monitored during and after the addition of hydrogen peroxide and cooling water was added to the cooling jacket in order to maintain an acceptable foam level and a temperature rise less than 4° C. per minute as well as a final temperature below 70° C. After the temperature increase had stopped, cooling was turned off and the product mixture was stirred for another 2 hours before transferring to transport (UPM LignoBoost TM BioPiva 100) with a dry-matter content of 67 wt.-% was de-lumped and suspended in 224 kg of water and stirred to form a homogenous suspension. With continued stirring 103 kg of 25% ammonia in water was pumped into the reactor and stirred another 2 hours to from a dark viscous solution of lignin.

To the stirred lignin solution 140 kg of 7.5 wt.-% at 20 to 25° C. hydrogen peroxide was added over 15 minutes. Temperature and foam container.

Based on the scale up runs it could be concluded that even though the reactions are exothermic a large part of the reaction heat is actually balanced out by the heat capacity of the water going from room temperature to about 60° C., and only the last part has to be removed by cooling. It should be noted that due to this and due to the short reaction-time this process would be ideal for a scale up and process intensification using continuous reactors such as in-line mixers, tubular reactors or CSTR type reactors. This would ensure good temperature control and a more well-defined reaction process.

Tests of the scale up batches indicated the produced oxidized lignin had properties in accordance to the batches produced in the lab.

TABLE IA 1.1

The amounts of materials used in their supplied form:

| material | wt.-% |
|---|---|
| UPM BioPiva 100, kraft lignin | 28 |
| $H_2O_2$, 30 wt.-% solution in water | 6.6 |
| $NH_3$, 25 wt.-%, aqueous solution | 16 |
| water | 49.4 |

TABLE IA 1.2

The amounts of active material used:

| material | wt.-% |
|---|---|
| kraft lignin | 19 |
| $H_2O_2$ | 2 |
| $NH_3$ | 4 |
| water | 75 |

TABLE IA 2

Elemental analysis of kraft lignin before and after oxidation:

| sample | N (wt.-%) | C (wt.-%) | H (wt.-%) | S (wt.-%) |
|---|---|---|---|---|
| kraft lignin | 0.1 | 64.9 | 5.8 | 1.7 |
| ammonia oxidized kraft lignin | 1.6 | 65.5 | 5.7 | 1.6 |

TABLE IA 3

Kraft lignin functional group distribution before and after oxidation obtained by $^{31}$P-NMR:

| | Concentration (mmol/g) | | |
|---|---|---|---|
| sample | Aliphatic OH | Phenolic OH | Acid OH |
| kraft lignin | 1.60 | 3.20 | 0.46 |
| ammonia oxidized kraft lignin | 2.11 | 3.60 | 0.80 |

TABLE IA 4

COOH group content in mmol/g as determined by aqueous titration:

| sample | COOH groups (mmol/g) |
|---|---|
| kraft lignin | 0.5 |
| ammonia oxidized kraft lignin | 0.9 |

TABLE IA 5

Table IA 5. Number (Mn) and weight (Mw) average molar masses as determined by size exclusion chromatography expressed in g/mol together with average carboxylic acid group content per lignin macromolecule before and after oxidation

| sample | Mn, g/mol | Mw, g/mol | Average COOH functionality |
|---|---|---|---|
| kraft lignin | 1968 | 21105 | 0.9 |
| ammonia oxidized kraft lignin | 2503 | 34503 | 2.0 |

Examples II

In the following examples, several oxidized lignins were prepared.

The following properties were determined for the oxidized lignins:

Component Solids Content:

The content of each of the components in a given oxidized lignin solution is based on the anhydrous mass of the components or as stated below.

Kraft lignin was supplier by UPM as BioPiva100™ as dry powder. NH$_4$OH 25% was supplied by Sigma-Aldrich and used in supplied form. H$_2$O$_2$, 30% (Cas no 7722-84-1) was supplied by Sigma-Aldrich and used in supplied form or by dilution with water. PEG 200 was supplied by Sigma-Aldrich and were assumed anhydrous for simplicity and used as such. PVA (Mw 89.000-98.000, Mw 85.000-124.000, Mw 130.000, Mw 146.000-186.000) (Cas no 9002-89-5) were supplied by Sigma-Aldrich and were assumed anhydrous for simplicity and used as such. Urea (Cas no 57-13-6) was supplied by Sigma-Aldrich and used in supplied form or diluted with water. Glycerol (Cas no 56-81-5) was supplied by Sigma-Aldrich and was assumed anhydrous for simplicity and used as such.

Oxidized Lignin Solids

The content of the oxidized lignin after heating to 200° C. for 1 hour is termed "Dry solid matter" and stated as a percentage of remaining weight after the heating.

Disc-shaped stone wool samples (diameter: 5 cm; height 1 cm) were cut out of stone wool and heat-treated at 580° C. for at least 30 minutes to remove all organics. The solids of the binder mixture were measured by distributing a sample of the binder mixture (approx. 2 g) onto a heat-treated stone wool disc in a tin foil container. The weight of the tin foil container containing the stone wool disc was weighed before and directly after addition of the binder mixture. Two such binder mixture loaded stone wool discs in tin foil containers were produced and they were then heated at 200° C. for 1 hour. After cooling and storing at room temperature for 10 minutes, the samples were weighed and the dry solids matter was calculated as an average of the two results.

COOH Group Content

The change in COOH group content was also determined by aqueous titration and utilization of the following formula:

$$C_{(COOH, mmol/g)} = \frac{(V_{2s,ml} - V_{1s,ml}) - (V_{2b,ml} - V_{1b,ml}) * C_{acid,mol/l}}{m_{s,g}}$$

where $V_{2s}$ and $V_{1s}$ are endpoint volumes of a sample while $V_{2b}$ and $V_{1b}$ are the volume for a blank sample. $C_{acid}$ is 0.1M HCl in this case and $m_{s,g}$ is the weight of the sample.

Method of producing an oxidized lignin:
1) Water and lignin were mixed in a 3-necked glass bottomed flask at water bath at room temperature (20 to 25° C.) during agitation connected with a condenser and a temperature logging device. Stirred for 1 h.
2) Ammonia was added during agitation in 1 portion.
3) Temperature increased to 35° C. by heating, if the slightly exothermic reaction with ammonia does not increase the temperature.
4) pH was measured.
5) Plasticizer PEG200 was added and stirred 10 min.
6) After the lignin was completely dissolved after approximately 1 hour, 30% $H_2O_2$ was added slowly in one portion.
7) The exothermic reaction by addition of $H_2O_2$ increased the temperature in the glass bottomed flask—if the reaction temperature was lower than 60° C., the temperature was increased to 60° C. and the sample was left at 60° C. for 1 hour.
8) The round bottomed flask was then removed from the water bath and cooled to room temperature.
9) Samples were taken out for determination of dry solid matter, COOH, viscosity, density and pH.

Oxidized Lignin Compositions

In the following, the entry numbers of the oxidized lignin example correspond to the entry numbers used in Table II.

Example IIA 71.0 g lignin UPM Biopiva 100 was dissolved in 149.0 g water at 20° C. and added 13.3 g 25% $NH_4OH$ and stirred for 1 h by magnetic stirrer, where after 16.8 g $H_2O_2$ 30% was added slowly during agitation. The temperature was increased to 60° C. in the water bath. After 1 hour of oxidation, the water bath was cooled and hence the reaction was stopped. The resulting material was analysed for COOH, dry solid matter, pH, viscosity and density.

Example IIE 71.0 g lignin UPM Biopiva 100 was dissolved in 88.8 g water at 20° C. and added 13.3 g 25% $NH_4OH$ and stirred for 1 hour by magnetic stirrer. PEG 200, 22.8 g was added and stirred for 10 min, where after 16.7 g $H_2O_2$ 30% was added slowly during agitation. The temperature was increased to 60° C. in the water bath. After 1 hour of oxidation, the water bath was cooled and hence the reaction was stopped. The resulting material was analysed for COOH, dry solid matter, pH, viscosity and density.

Example IIC 71.0 g lignin UPM Biopiva 100 was dissolved in 57.1 g water at 20° C. and added 13.3 g 25% $NH_4OH$ and stirred for 1 h by mechanical stirrer, where after 16.6 g $H_2O_2$ 30% was added slowly during agitation. The temperature was increased to 60° C. in the water bath. After 1 hour of oxidation, the water bath was cooled and hence the reaction was stopped. The resulting material was analysed for COOH, dry solid matter, pH, viscosity and density.

Example IIF 71.0 g lignin UPM Biopiva 100 was dissolved in 57.1 water at 20° C. and added 13.3 g 25% $NH_4OH$ and stirred for 1 hour by mechanical stirrer. PEG 200, 19.0 g was added and stirred for 10 min, where after 16.6 g $H_2O_2$ 30% was added slowly during agitation. The temperature was increased to 60° C. in the water bath. After 1 hour of oxidation, the water bath was cooled and hence the reaction was stopped. The resulting material was analysed for COOH, dry solid matter, pH, viscosity and density.

TABLE IIA

| Example | Ex. IIA | Ex. IIB | Ex. IIC | Ex. IID | Ex. IIE | Ex. IIF | Ex. IIG | Ex. IIH | Ex. III | Ex. IIJ |
|---|---|---|---|---|---|---|---|---|---|---|
| Materials, weight in grams: | | | | | | | | | | |
| Lignin | 71.0 | 71.0 | 71.0 | 71.0 | 71.0 | 71.0 | 71.0 | 71.0 | 71.0 | 71.0 |
| Water | 149.0 | 88.8 | 57.1 | 17.7 | 88.8 | 57.1 | 17.7 | 88.8 | 57.1 | 17.7 |
| NH4OH (25 wt % solution in water) | 13.3 | 13.3 | 13.3 | 13.4 | 13.3 | 13.3 | 13.4 | 13.3 | 13.3 | 13.4 |
| H2O2 (30 wt % solution in water) | 16.8 | 16.7 | 16.6 | 17.2 | 16.7 | 16.6 | 17.2 | 16.7 | 16.6 | 17.2 |
| PEG200 | 0.0 | 0.0 | 0.0 | 0.0 | 22.8 | 19.0 | 14.2 | 0.0 | 0.0 | 0.0 |
| PVA | 0 | 0 | 0 | 0 | 0 | 0 | 0 | 5 | 10 | 15 |
| Urea (25 wt % solution in water) | 0 | 0 | 0 | 0 | 0 | 0 | 0 | 0 | 0 | 0 |
| Glycerol | 0 | 0 | 0 | 0 | 0 | 0 | 0 | 0 | 0 | 0 |
| Sorbitol | 0 | 0 | 0 | 0 | 0 | 0 | 0 | 0 | 0 | 0 |
| Dry solid matter in %, 200° C., 1 h | 18.2 | 27.1 | 30.5 | 40.1 | 26.5 | 33 | 40.3 | 28.2 | 34.4 | 46.3 |

TABLE IIA-continued

| | | | | | | | | | | |
|---|---|---|---|---|---|---|---|---|---|---|
| pH | 9.5 | 9.5 | 9.5 | 9.5 | 9.5 | 9.5 | 9.5 | 9.5 | 9.5 | 9.5 |
| Viscosity, 20° C. cP | 450.5 | 25000 | above 100000 | above 100000 | 15000 | 25000 | 50000 | 15000 | 25000 | 50000 |
| Appearance | ** | *** | * | * | *** | *** | *** | *** | *** | *** |
| COOH, mmol/g | 1.1 | 0.9 | 0.9 | 0.8 | 0.8 | 1.9 | — | — | — | — |
| Initial lignin conc. Weight fraction of aq. sol. | 0.32 | 0.44 | 0.55 | 0.80 | 0.44 | 0.55 | 0.80 | 0.44 | 0.55 | 0.80 |

| Example | Ex. IIK | Ex. IIL | Ex. IIM | Ex. IIN | Ex. IIO | Ex. IIP | Ex. IIQ | Ex. IIR | Ex. IIS |
|---|---|---|---|---|---|---|---|---|---|
| Materials, weight in grams: | | | | | | | | | |
| Lignin | 71.0 | 71.0 | 71.0 | 71.0 | 71.0 | 71.0 | 93.5 | 112.3 | 149.5 |
| Water | 88.8 | 57.1 | 17.7 | 88.8 | 57.1 | 17.7 | 117 | 90.3 | 37.3 |
| NH4OH (25 wt % solution in water) | 13.3 | 13.3 | 13.4 | 13.3 | 13.3 | 13.4 | 17.5 | 21 | 28.3 |
| H2O2 (30 wt % solution in water) | 16.7 | 16.6 | 17.2 | 16.7 | 16.6 | 17.2 | 22 | 26.3 | 36.3 |
| PEG200 | 0.0 | 0.0 | 0.0 | 0.0 | 0.0 | 0.0 | 0.0 | 0.0 | 0.0 |
| PVA | 0 | 0 | 0 | 0 | 0 | 0 | 0 | 0 | 0 |
| Urea (25 wt % solution in water) | 3.2 | 3.8 | 5.0 | 0 | 0 | 0 | 0 | 0 | 0 |
| Glycerol | 0 | 0 | 0 | 16.0 | 21.0 | 30.0 | 0 | 0 | 0 |
| Sorbitol | 0 | 0 | 0 | 0 | 0 | 0 | 16.0 | 21.0 | 30.0 |
| Dry solid matter in %, 200° C., 1 h | 25.1 | 30.2 | 40.2 | 25.3 | 29.3 | 40.3 | 25.3 | 30.5 | 38.8 |
| pH | 9.5 | 9.5 | 9.5 | 9.5 | 9.5 | 9.5 | 9.5 | 9.5 | 9.5 |
| Viscosity, 20° C. cP | 15000 | 25000 | 50000 | 15000 | 25000 | 50000 | 15000 | 25000 | 50000 |
| Appearance | *** | *** | *** | *** | *** | *** | *** | *** | *** |
| COOH, mmol/g | — | — | — | — | — | — | — | — | — |
| Initial lignin conc. Weight fraction of aq. sol. | 0.44 | 0.55 | 0.80 | 0.44 | 0.55 | 0.80 | 0.44 | 0.55 | 0.80 |

\* inhomogenous black thick solution;
\*\* black solution;
\*\*\* homogenous black thick solution.

Example III 8.5 l hot water (50° C.) and 1.9 l NH$_4$OH (24.7%) was mixed, where after 9.0 kg lignin (UPM biopiva 100) was added slowly over 10 minutes at high agitation (660 rpm, 44 Hz).

The temperature increased by high shear forces. After 30 minutes, 4 l of hot water was added, and the material was stirred for another 15 minutes before adding the remaining portion of hot water (5 l). Samples were taken out for analyses of un-dissolved lignin by use of a Hegman Scale and pH measurements.

This premix was then transferred to a rotor-stator device and a reaction device where the oxidation was made by use of H$_2$O$_2$ (17.5 vol.-%). The reaction device used in this case has at least partially a reaction tube and a reaction vessel. Dosage of the premixture was 150 l/h and the H$_2$O$_2$ was dosed at 18 l/h.

In the present case, a Cavitron CD1000 rotor-stator device was used to carry out the mixing/oxidation step. The rotor-stator device was running at 250 Hz (55 m/s circumferential speed) with a counter pressure at 2 bar. The dwell time in the reaction tube was 3.2 minutes and in the reaction vessel 2 hours.

Temperature of the premixture was 62° C., and the oxidation step increased the temperature to 70° C.

The final product was analysed for the COOH group content, dry solid matter, pH, viscosity and remaining H$_2$O$_2$.

TABLE III

| Example | Dry solid matter, 200 C., 1 h, % | COOH, mmol/g solids | pH | viscosity |
|---|---|---|---|---|
| III | 22.3 | 1.13 | 9.6 | medium |

Example IV 484 l hot water (70° C.) and 47.0 l NH$_4$OH (24.7%) was mixed, where after 224.0 kg lignin (UPM biopiva 100) was added slowly over 15 minutes at high agitation. Samples were taken out for analyses of un-dissolved lignin by use of a Hegman Scale and pH measurements.

This premixture was then transferred to a static mixer and a mixer/heat-exchanger, where the oxidation was made by use of H$_2$O$_2$ (35 vol.-%). Dosage of the premixture was 600 l/h and the H$_2$O$_2$ was dosed at 17.2 l/h. The dwell time in the mixer/heat-exchanger was 20 minutes.

The temperature of the mixture increased during the oxidation step up to 95° C.

The final product was analysed for the COOH group content, dry solid matter, pH, viscosity and remaining H$_2$O$_2$.

A binder was made based on this AOL: 49.3 g AOL (19.0% solids), 0.8 g primid XL552 (100% solids) and 2.4 g PEG200 (100% solids) were mixed with 0.8 g water to yield 19% solids; and then used for test of mechanical properties in bar tests.

Bar Tests

The mechanical strength of the binders was tested in a bar test. For each binder, 16 bars were manufactured from a mixture of the binder and stone wool shots from the stone wool spinning production.

A sample of this binder solution having 15% dry solid matter (16.0 g) was mixed well with shots (80.0 g). The resulting mixture was then filled into four slots in a heat resistant silicone form for making small bars (4×5 slots per form; slot top dimension: length=5.6 cm, width=2.5 cm; slot bottom dimension: length=5.3 cm, width=2.2 cm; slot height=1.1 cm). The mixtures placed in the slots were then pressed with a suitably sized flat metal bar to generate even bar surfaces. 16 bars from each binder were made in this fashion. The resulting bars were then cured at 200° C. The curing time was 1 h. After cooling to room temperature, the bars were carefully taken out of the containers. Five of the bars were aged in a water bath at 80° C. for 3 hours.

After drying for 1-2 days, the aged bars as well as five unaged bars were broken in a 3 point bending test (test speed: 10.0 mm/min; rupture level: 50%; nominal strength: 30 N/mm$^2$; support distance: 40 mm; max deflection 20 mm; nominal e-module 10000 N/mm$^2$) on a Bent Tram machine to investigate their mechanical strengths. The bars were placed with the "top face" up (i.e. the face with the dimensions length=5.6 cm, width=2.5 cm) in the machine.

| Sample name | AOL characteristica | | | Bar tests | |
|---|---|---|---|---|---|
| | solids, 200 C., 1 h, % | COOH (mmol/g solids) | Viscosity | initial strength (kN) | Aged strength (kN) |
| Ex IV | 17.7 | 1.69 | low | 0.28 | 0.11 |

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The disclosure is illustrated in the accompanying drawings in which

FIG. 12 shows different lignin precursors and common interunit linkages;

FIG. 13 illustrates the at least four groups of technical lignins available in the market;

FIG. 14 shows a summary of the properties of the technical lignins.

Corresponding reference numerals indicate corresponding parts throughout the several views of the drawings.

DETAILED DESCRIPTION

Figure 1:
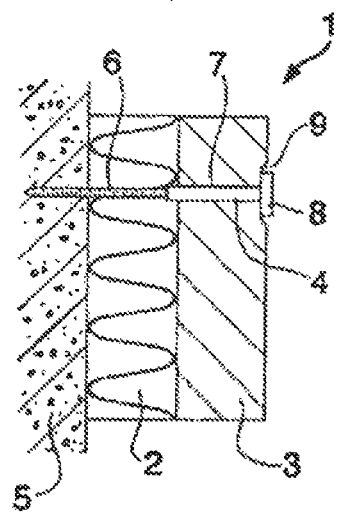
FIG. 1 shows a first embodiment of a facade system according to the disclosure.

Example embodiments will now be described more fully with reference to the accompanying drawings.

FIGS. 1 and 6 to 10 show different embodiments of façade systems (ETICS) according to the disclosure each comprising a thermal and/or acoustic insulation of at least one insulation element, mechanical fasteners 4 and a rendering 13 (not shown in FIGS. 7 to 10). The insulation element comprises at least a bonded mineral fibre or mineral wool product made from mineral fibres and a binder. In the following said insulation element is also referred to as mineral wool insulation plate 2, or insulation plate 2, or insulating composite plate 12 containing mineral wool and aerogel. Other embodiments of the insulation element comprise a plate 3 representing an aerogel particle fibre composite, further below also referred to as aerogel containing plate 3.

A first embodiment of a façade system is shown in FIG. 1 represented by an insulation sub-system 1 as a part of the ETICS comprising a mineral wool insulation plate 2 at a building wall 5 and mounted by a mechanical fastener 4 into the building wall 5 holding the insulation plate 2. The insulation plate 2 is glued (not shown) to the wall 5. The part of the ETICS is shown in cross section displaying the mechanical fastener 4. The mechanical fastener 4 is a polyamide based hollow dowel 7 with a metal screw 6 inserted in the hollow dowel 7. The dowel 7 has a head 8 in shape of a round plate with a diameter of preferably around 90 mm. The head 8 exerts a pressure on the surface of the insulation plate 2 and there is a slight indentation 9 into the surface due to the static hold force of the mounted screw 6. The total system of fastener 4 and insulation plate 2 forming an insulation sub-system which is mechanically rigid and resistant to wind loads.

The insulation shown in FIG. 1 consists of insulation plates 2 made from mineral wool and each having a rectangular major surface onto which a rendering is applied. The rendering 13 is made from two layers of mortar and the layer being in direct contact to the insulation plate is a so-called base coat.

Instead of a one layered insulation plate 2 multilayered insulation plates can be used, each having at least two layers of different density. These insulation plates are so-called dual-density plates and are shown in a second embodiment according to FIG. 6.

The insulation plate 2 may also be a mineral wool lamella plate which consists of several lamellas of mineral wool glued together in their length direction to form the plate and where the mineral fibre direction is predominantly perpendicular to the major surface as is conventional for such mineral wool lamella plates. The thickness is 100 mm and the width by length is 400 by 1200 mm and the density of the mineral wool plate is 75 kg/m$^3$.

A plate 3 (FIG. 6) can be present, representing an aerogel particle fibre composite comprising stone fibres, aerogel particles and a means for binding the constituents and covering the insulation plate 2.

Figure 6:
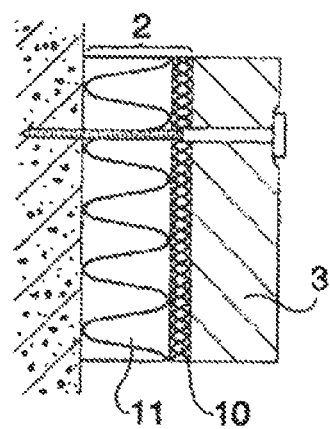
FIG. 6 shows a second embodiment of a mounted insulation element being part of an ETICS according to the present disclosure.

FIG. 6 shows an insulation sub-system like in FIG. 1 with the amendment that the insulation plate 2 shown in FIG. 6 is a dual density mineral wool plate which has a surface layer 10 of about 20 mm thickness of a compacted mineral wool layer with a density of about 160 kg/m$^3$ and a layer 11 of about 120 mm thickness of mineral wool layer with a density of about 90 kg/m$^3$; the layer 11 with the lower density is facing the wall 5 and the layer 10 with the higher density is facing the plate 3. The plate 3 improves the thermal performance of the ETICS and may be connected to insulation plate 2 by using an adhesive which might be the binder used in the insulation plate 2. Furthermore, the binder used in the plate 3 being a matrix of mineral fibres and additives, such as aerogel particles, can be identical with the binder used in the insulation plate 2. The plate 3 increases the insulation properties of the ETICS. Plate 3 can be connected to the insulation plate 2 by an adhesive which can be the binder used in the insulation plate 2.

Figure 7:
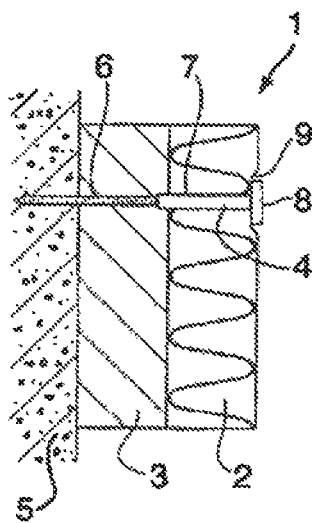
FIG. 7 shows a third embodiment of a mounted insulation element being part of an ETICS according to the present disclosure.

FIG. 7 shows an insulation sub-system comprising an plate 3 provided on the building wall 5 and arranging a insulation plate 2 on top of the plate 3 and mounting a mechanical fastener 4 into the wall 5 holding both the plates 2, 3; the plate 3 is glued (not shown) to the wall 5 and can be identical to the plate 3 according to FIG. 6. The part of the ETICS is shown in cross section displaying the mechanical fastener 4. The mechanical fastener 4 is a polyamide based hollow dowel 4 with a metal screw 6 inserted in the hollow element 7 and the dowel 4 has a head 8 in shape of a round plate with a diameter of preferably around 60 mm. The head 8 exerts a pressure on the surface of the insulation plate 2 and there is an indentation 9 into the surface due to the static hold force of the mounted screw 6 and the mineral wool of the insulation plate 2 is compressed between the fastener head 8 and the surface of the aerogel containing plate 3. The total system of fasteners, insulation plate 2 and plate 3 is mechanically rigid and has improved properties over a sub-system exclusively consisting of mineral wool plates; the pull-through resistance is in particular improved and the insulation plate 2 provides a mechanical protection to the aerogel containing plate 3 due to its resilient characteristics.

The insulation shown in FIG. 7 consists of two plates 2, 3 each having a rectangular major surface of substantially the same length and width as the other plate 2, 3 and where the two plates 2, 3 are being placed commensurate so that the two plates 2, 3 substantially exactly cover each other. The insulation plate 2 is in this example a mineral wool laminar plate of the stone wool type where the mineral fibre direction is predominantly parallel to the major surface. The thickness of the insulation plate 2 is 40 mm and the width by length is 625 by 800 mm and the density of the insulation plate is 120 kg/m$^3$. The aerogel containing plate 3 is in this example an aerogel matrix composite comprising polymer fibres in an aerogel matrix.

Figure 8:
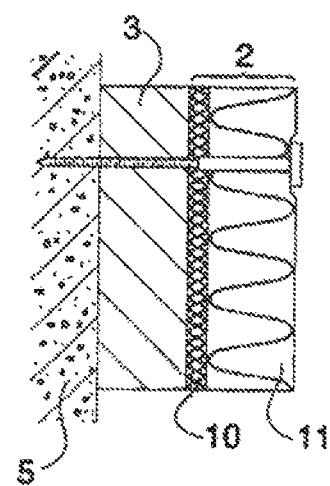
FIG. 8 shows a fourth embodiment of a mounted insulation element being part of an ETICS according to the present disclosure.

FIG. 8 shows an insulation sub-system 1 like in FIG. 7 with the amendment that the insulation plate 2 shown in FIG. 7 is a dual density insulation plate 2 of the stone wool type shown in FIG. 6, too, which has a surface layer 10 of about 20 mm thickness of a compacted mineral wool layer with a density of about 160 kg/m$^3$ and a layer 11 of about 60 mm thickness of mineral wool layer with a density of about 90 kg/m$^3$; the layer 11 with the lower density is facing outwards.

Figure 9:
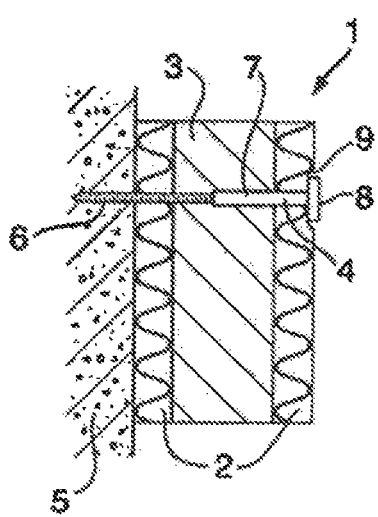
FIG. 9 shows a fifth embodiment of a mounted insulation element being part of an ETICS according to the present disclosure.

FIG. 9 shows an insulation sub-system 1 comprising an insulation plate 2 of mineral wool at the building wall 5 and arranging an aerogel containing plate 3 on top of the insulation plate 2 and arranging a further insulation plate 2 on top of the aerogel containing plate 3; the three plates 2, 3 are mounted with a mechanical fastener 4 into the wall 5 holding the plates 2, 3. Additionally the insulation plate 2 can be connected to the wall 5 by an adhesive and further adhesives can be present between the insulation plates 2 and the plate 3. Such adhesive can be the binder used in the insulation plate 2. The part of the ETICS is shown in cross section displaying the mechanical fastener 4. The mechanical fastener 4 is a polyamide based hollow dowel 7 with a metal screw 6 inserted in the hollow dowel 7 and the dowel 7 has a head 8 in shape of a round plate with a diameter of preferably around 60 mm.

The head 8 exerts a pressure on the surface of the insulation plate 2 and there is an indentation 9 into the surface due to the static hold force of the mounted screw and the mineral wool of insulation plate 2 is compressed between the fastener head 8 and the surface of the plate 3.

The total system of fasteners 4, the sandwich of the aerogel and mineral fibres containing plate 3 and the two outside layered insulation plates 2 is mechanically rigid and has improved properties over a sub-system exclusively consisting of mineral wool plates; the pull-through resistance is in particular improved but also the overall weight is lowered.

The insulation shown in FIG. 9 consists of three plates 2, 3 all having a rectangular major surface of substantially the same length and width as the other plates 2, 3 and where the three plates 2, 3 are being placed commensurate so that the three plates substantially exactly cover each other. The insulation plates 2 are in this example mineral wool laminar plates of the stone wool type where the mineral fibre direction is predominantly parallel to the major surfaces. The thickness is 80 mm and the width by length is 625 by 800 mm and the density of the mineral wool plate 2 is 100 kg/m$^3$. The plate 3 is in this example an aerogel particle fibre composite comprising aerogel particles and a means for binding the constituents.

Figure 10:
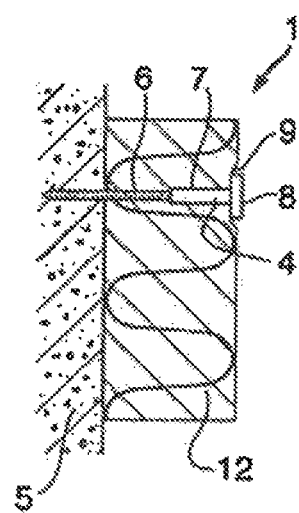
FIG. 10 shows a sixth embodiment of a mounted insulation element being part of an ETICS according to the present disclosure.
Figure 11:
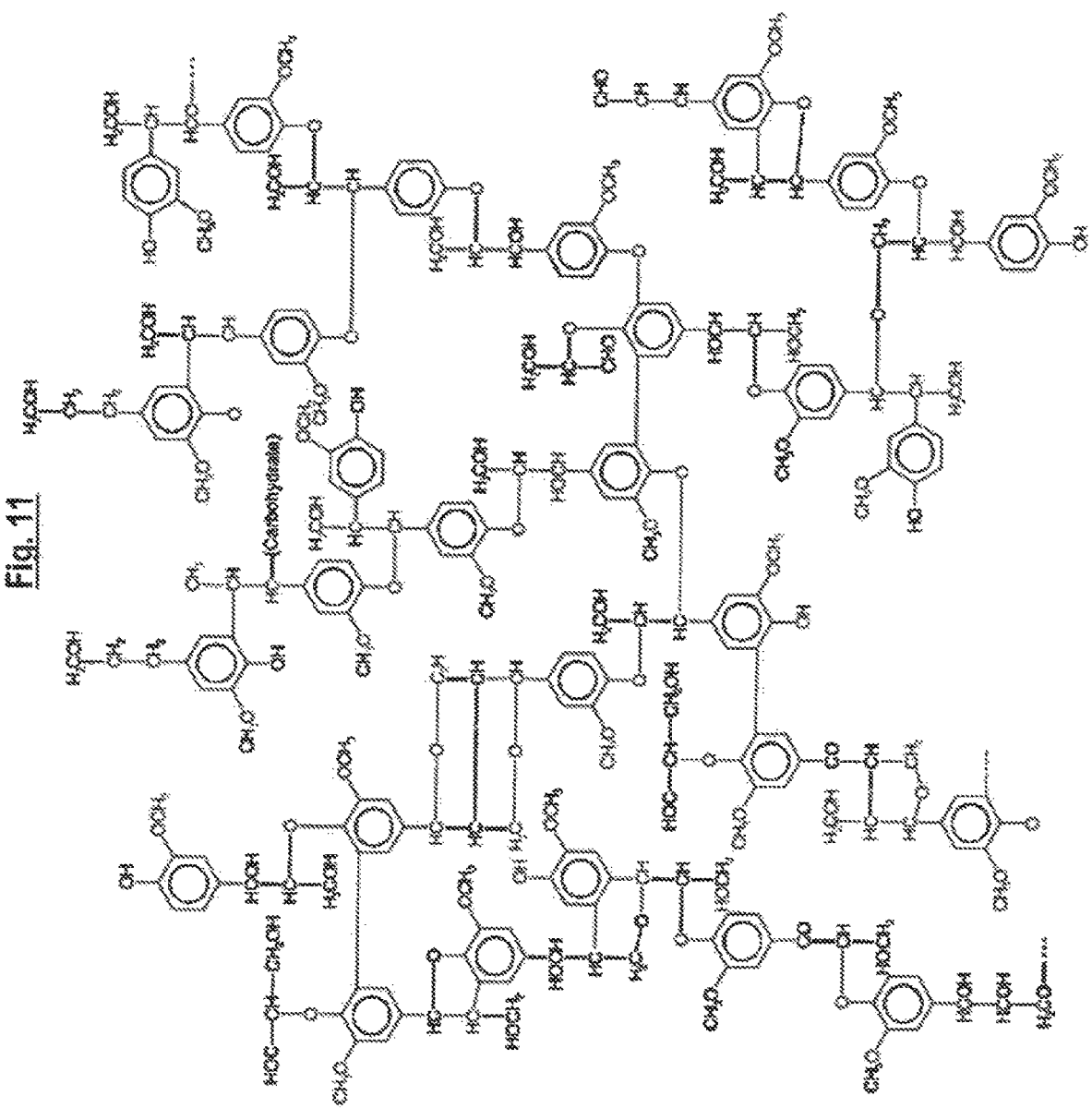
FIG. 11 shows a section from a possible lignin structure.

FIG. 10 shows an insulation sub-system 1 comprising an insulating composite plate 12 containing mineral wool and aerogel; the plate is mounted with a mechanical fastener 4 into the wall 5 holding the composite plate 12. The part of the ETICS is shown in cross section displaying the mechanical fastener 4. The mechanical fastener 4 is a polyamide based hollow dowel 7 with a metal screw 6 inserted in the hollow dowel 7 and the dowel 7 has a head 8 in shape of a round plate with a diameter of preferably around 60 mm.

The head 8 exerts a pressure on the surface of the composite plate 12 and there is an indentation 9 into the surface due to the static hold force of the mounted screw 6 and the composite plate 12 is compressed between the fastener head 8 and the surface of the composite plate 12.

The total system of fasteners 4, mineral wool-aerogel-composite plate 12 is mechanically rigid and has improved properties over a sub-system exclusively consisting of mineral wool; the pull-through resistance is in particular improved but also the overall weight is lowered.

The insulation shown in FIG. 10 has a rectangular major surface. The thickness is 120 mm and the width by length is 625 by 800 mm and the density of the composite plate 12 is 100 kg/m$^3$.

The binder used in the insulation element 2, 3, 12 and/or for the connection of the insulation elements 2, 3, 12 to each other comprises a first component in form of one or more ammonia-oxidized lignins.

Figure 2:
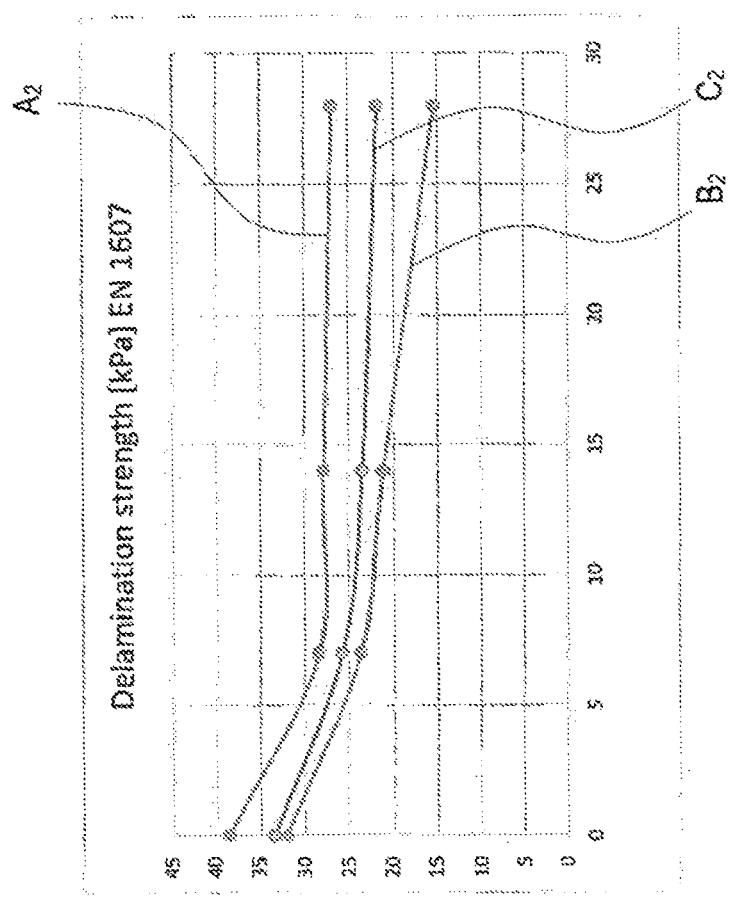
FIG. 2 shows a diagram showing the delamination strength of an insulation element used in an ETICS compared to the delamination strength of an insulation element according to the prior art.

The diagram according to FIG. 2 shows absolute values of the delamination strength of an insulation element according to the disclosure (graph $C_2$) compared with the delamination strength of an insulation element containing one of the assignees prior art non-added formaldehyde binder shown in graph $B_2$ and the delamination strength of an insulation element containing traditional phenol-urea-formaldehyde binder shown in graph $A_2$.

The delamination strength is measured according to EN 1607:2013 and the first initial measurement is carried out on unaged samples immediately or shortly after production of the insulation element. This initial testing and the respective average result of a representative number of samples is illustrated at time '0' on the x-axis of the diagram. Said time '0' corresponds with day '0' respectively the start of the accelerated ageing test according to the following description below.

In order to determine the ageing resistance of mineral fibre products exposed to moisture and heating during the service life of constructions, such mineral fibre products with focus on mechanical properties are subjected to accelerated ageing. The ageing resistance is defined as the ability of the product to maintain the original mechanical properties, and it is calculated as the aged strength in percent of the original strength. The test procedure follows the so called Nordtest method NT Build 434: 1995.05, extended to 28 days. The aim of said method is to expose insulation materials to accelerated ageing due to increased temperature and heat. It is applicable to all insulation materials manufactured as insulation boards. The method is not predictive i.e. it is not intended for assessment of the service life, but it is a precondition for a satisfactory performance that ageing due to this method does not cause major changes in the properties of the materials under investigation. Experiences over more than two decades with the Nordtest method have proven to deliver reliable data to ensure satisfactory mechanical performance of inter alia mineral fibre products as insulation elements for use in facade systems.

According to the method, a representative number of test specimens are exposed to heat-moisture action for 7, 14 and 28 days at 70±2° C. and 95±5% relative humidity (RH) in a climatic chamber. Subsequently, the specimens are placed at 23±2° C. and 50±5% RH for at least 24 hours and upon drying are prepared for testing of mechanical performance, like e.g. the delamination strength is measured according to EN 1607:2013, or compression strength according to EN 826:2013 as will be described further below.

The relative ageing resistance is then calculated in % of and based on the initial absolute value measured at time '0'.

Results are documented and illustrated for 7, 14 and 28 days of accelerated ageing.

With respect to the figures and examples given here, the insulation element is a bonded mineral fibre facade product, commercially available at the assignee or affiliated companies which has been produced with the different binder types mentioned and tested for its mechanical properties. The product in question provides a target density of around 145 kg/m$^3$ and a loss on ignition (LOI) of approx. 3.8 wt.-%.

The following Table I shows the delamination strength [kPa] EN 1607 according to FIG. 2.

TABLE I

|  | 0 days | 7 days | 14 days | 28 days |
|---|---|---|---|---|
| $A_2$ | 38.6 | 28.4 | 27.9 | 26.9 |
| $B_2$ | 32.1 | 23.7 | 21.1 | 15.3 |
| $C_2$ | 33.4 | 25.7 | 23.5 | 21.8 |

Table I shows the absolute delamination strength of the insulation element according to the disclosure ($C_2$) compared to an insulation element containing a phenol-formaldehyde binder ($A_2$) and to an insulation element containing a non-added formaldehyde binder ($B_2$). The corresponding graphs are shown in FIG. 2.

Figure 3:
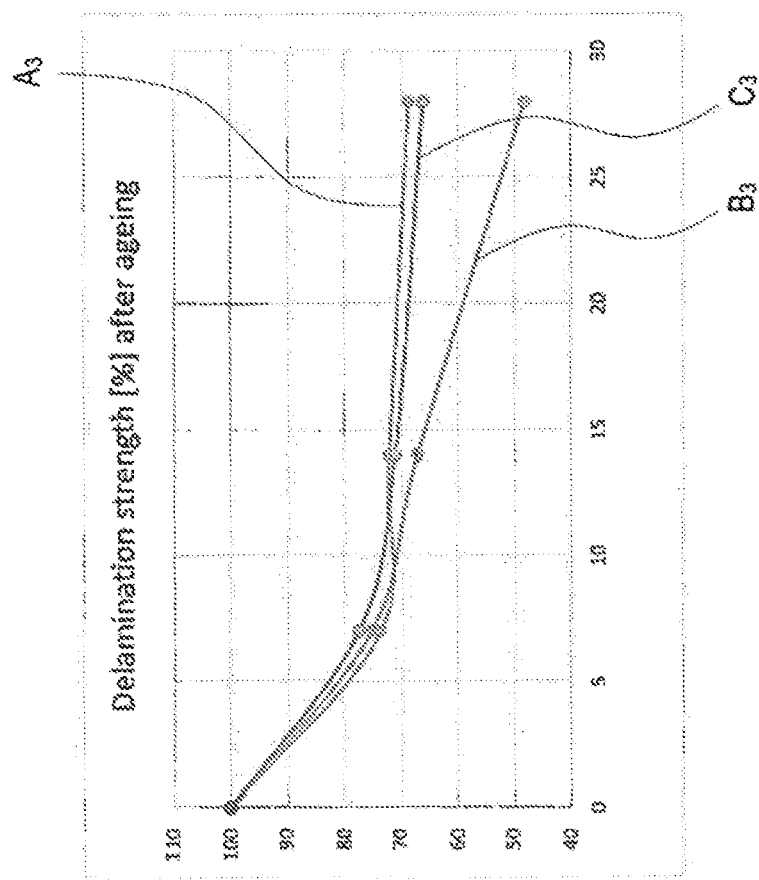
FIG. 3 shows a diagram showing the delamination strength of an insulation element used in an ETICS after ageing compared to the delamination strength of an insulation element according to the prior art after ageing.

The following Table II shows the relative delamination strength according to table I in % of initial according to FIG. 3.

TABLE II

|  | 0 days | 7 days | 14 days | 28 days |
|---|---|---|---|---|
| $A_3$ | 100.0 | 73.6 | 72.1 | 68.7 |
| $B_3$ | 100.0 | 75.2 | 67.1 | 48.3 |
| $C_3$ | 100.0 | 77.5 | 71.1 | 66.2 |

Table II shows the relative delamination strength of the insulation element according to the disclosure ($C_3$) compared to an insulation element containing a phenol-formaldehyde binder ($A_3$) and to an insulation element containing a non-added formaldehyde binder ($B_3$). The corresponding graphs are shown in FIG. 3.

In Tables I and II it can be seen that the delamination strength of the insulation element according to the disclosure is very close to the delamination strength of the insulation element containing a phenol-formaldehyde binder. Furthermore, it can be seen that the loss of delamination strength of the insulation element containing a non-added formaldehyde binder increases much more than the delamination strength of the insulation element according to the disclosure. Furthermore, the delamination strength of the insulation element according to the disclosure is very close to the delamination strength of the insulation element containing a phenol-formaldehyde binder. From FIGS. 2 and 3 it can be seen that the graphs $C_2/C_3$ and $A_2/A_3$ are approximately parallel to each other.

From Table II and FIG. 3 the relative delamination strength of the insulation element according to the disclosure (graph $C_3$) compared to insulation elements containing a phenol-formaldehyde binder (graph $A_3$) or insulation elements containing a non-added formaldehyde binder (graph $B_3$). All insulation elements to be compared were exposed to an ageing process according the before standing description.

Furthermore, it can be seen from Table II and from FIG. 3, that the values of delamination of the insulation element according to the disclosure are approximately equal to the values of delamination of the insulation element containing phenol-formaldehyde binder $A_3$.

Figure 4:
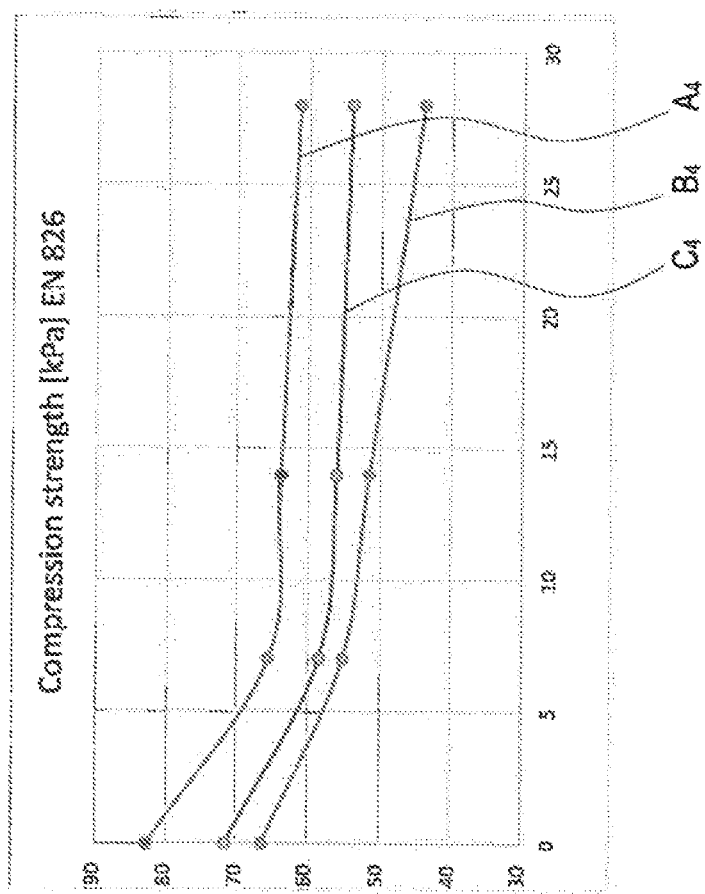
FIG. 4 shows a diagram showing the compression strength of an insulation element used in an ETICS compared to the compression strength of an insulation element according to the prior art.

The following Table III shows the absolute compression strength [kPa] EN 826 according to FIG. 4.

TABLE III

|     | 0 days | 7 days | 14 days | 28 days |
|-----|--------|--------|---------|---------|
| $A_4$ | 82.6 | 65.5 | 63.9 | 61.3 |
| $B_4$ | 66.3 | 55.1 | 51.4 | 43.9 |
| $C_4$ | 71.5 | 58.5 | 56.1 | 54.0 |

Table III shows the absolute compression strength of the insulation element according to the disclosure ($C_4$) compared to an insulation element containing a phenol-formaldehyde binder ($A_4$) and to an insulation element containing a non-added formaldehyde binder ($B_4$). The corresponding graphs are shown in FIG. 4.

FIG. 4 shows the compression strength of an insulation element according to the disclosure (graph $C_4$) compared with the compression strength of an insulation element containing mineral fibres and a non-added formaldehyde binder shown in graph $B_4$ and the compression strength of an insulation element containing mineral fibres and a phenol-formaldehyde binder shown in graph $A_4$.

The compression strength is measured according to EN 826:2013 and it can be seen, that the compression strength is measured immediately after production of the insulation element, and seven, fourteen and twenty-eight days after production of the insulation element 4.

Whereas the compression strength of the insulation element according to the disclosure is very close to the compression strength of the insulation element containing a phenol-formaldehyde binder ($A_4$) it can be seen that the loss of compression strength of the insulation element containing a non-added formaldehyde binder ($B_4$) increases much more than the compression strength of the insulation element according to the disclosure. Furthermore, the compression strength of the insulation element according to the disclosure is very close to the compression strength of the insulation element containing a phenol-formaldehyde binder ($A_4$). It can be seen that the graphs $C_2$ and $A_2$ are approximately parallel to each other.

Figure 5:
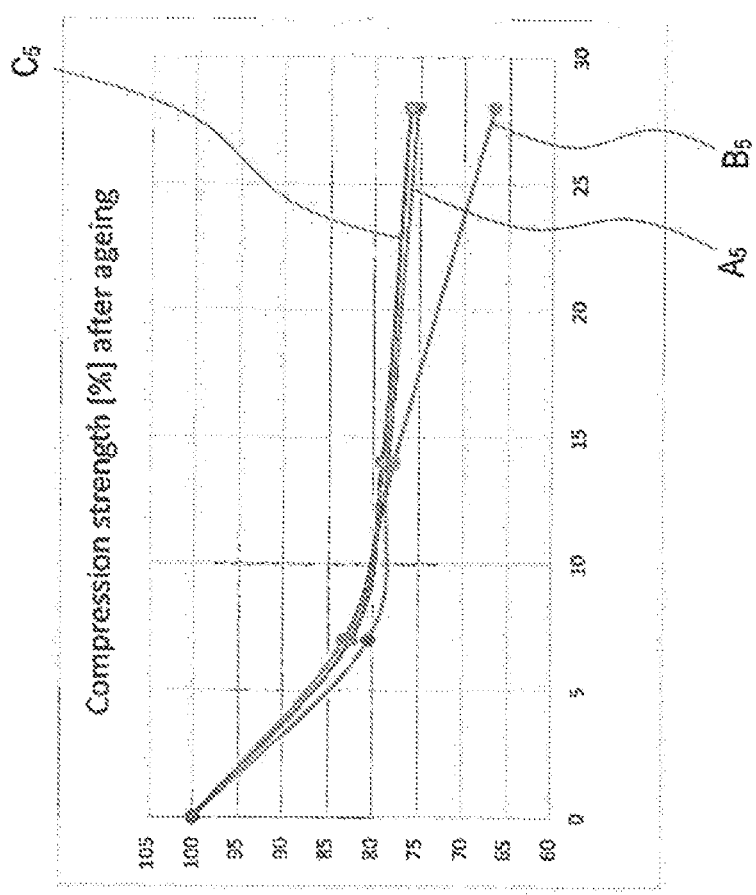
FIG. 5 shows a diagram showing the compression strength of an insulation element used in an ETICS after ageing compared to the compression strength of an insulation element according to the prior art after ageing

The following Table IV shows the relative compression strength according to table III in % of initial according to FIG. 5.

TABLE IV

|     | 0 days | 7 days | 14 days | 28 days |
|-----|--------|--------|---------|---------|
| $A_5$ | 100.0 | 80.5 | 78.5 | 75.2 |
| $B_5$ | 100.0 | 83.2 | 77.8 | 66.6 |
| $C_5$ | 100.0 | 82.5 | 79.0 | 76.1 |

Table IV shows the relative compression strength of the insulation element according to the disclosure ($C_5$) compared to an insulation element containing a phenol-formaldehyde binder ($A_5$) and to an insulation element containing a non-added formaldehyde binder ($B_5$). The corresponding graphs are shown in FIG. 5.

From FIG. 5 the relative compression strength of the insulation element according to the disclosure (graph $C_5$) compared to insulation elements containing a phenol-formaldehyde binder (graph $A_5$) or insulation elements containing a non-added formaldehyde binder (graph $B_5$). All insulation elements to be compared were exposed to an ageing process containing the steps as described before.

Furthermore, it can be seen from FIG. 5, that the values of compression strength of the insulation element according to the disclosure are approximately equal to the values of compression strength of the insulation element containing phenol-formaldehyde binder.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

What is claimed is:

1. A façade system for a building, comprising a thermal and/or acoustic insulation, consisting of at least one insulation element being a bonded mineral fibre product made of mineral fibres and a cured aqueous binder composition, whereby the insulation element is adapted to be fixed to an outer surface of the building by mechanical fastening elements and/or an adhesive, covered with a rendering, and whereby the aqueous binder composition prior to curing comprises a first component in form of one or more oxidized lignins, a second component in form of one or more cross-linkers, and a third component in form of one or more plasticizers, whereby the insulation element has a bulk density between 70 kg/m³ and 150 kg/m³, wherein the first component is in form of one or more ammonia-oxidized lignins (AOL's).

2. A façade system for a building, comprising a thermal and/or acoustic insulation, consisting of at least one insulation element being a bonded mineral fibre product made of mineral fibres and a cured aqueous binder composition, whereby the insulation element is adapted to be fixed to an outer surface of the building by mechanical fastening elements and/or an adhesive, covered with a rendering, and whereby the aqueous binder composition prior to curing comprises a first component in form of one or more oxidized lignins, a second component in form of one or more cross-linkers, and a third component in form of one or more plasticizers, whereby the insulation element has a bulk density between 70 kg/m³ and 150 kg/m³, wherein the second component comprises one or more cross-linkers selected from β-hydroxyalkylamide-cross-linkers and/or oxazoline-cross-linkers.

3. A façade system for a building, comprising a thermal and/or acoustic insulation, consisting of at least one insulation element being a bonded mineral fibre product made of mineral fibres and a cured aqueous binder composition, whereby the insulation element is adapted to be fixed to an outer surface of the building by mechanical fastening elements and/or an adhesive, covered with a rendering, and whereby the aqueous binder composition prior to curing comprises a first component in form of one or more oxidized lignins, a second component in form of one or more cross-linkers, and a third component in form of one or more plasticizers, whereby the insulation element has a bulk density between 70 kg/m³ and 150 kg/m³, wherein the second component comprises one or more cross-linkers selected from a group consisting of polyethylene imine, polyvinyl amine, fatty amines; and/or one more cross-linkers in form of fatty amides; and/or one or more cross-linkers selected from a group consisting of dimethoxyethanal, glycolaldehyde, glyoxalic acid; and/or one or more cross-linkers selected from polyester polyols; and/or one or more cross-linkers selected from a group consisting of starch, modified starch, CMC; and/or one or more cross-linkers in form of aliphatic multifunctional carbodiimides; and/or one or more cross-linkers selected from melamine based cross-linkers.

4. A façade system for a building, comprising a thermal and/or acoustic insulation, consisting of at least one insulation element being a bonded mineral fibre product made of mineral fibres and a cured aqueous binder composition, whereby the insulation element is adapted to be fixed to an outer surface of the building by mechanical fastening elements and/or an adhesive, covered with a rendering, and whereby the aqueous binder composition prior to curing comprises a first component in form of one or more oxidized lignins, a second component in form of one or more cross-linkers, and a third component in form of one or more plasticizers, whereby the insulation element has a bulk density between 70 kg/m$^3$ and 150 kg/m$^3$, wherein the third component comprises one or more plasticizers selected from a group consisting of polyethylene glycols, polyethylene glycol ethers, polyethers, hydrogenated sugars, phthalates and/or acids.

5. A façade system for a building, comprising a thermal and/or acoustic insulation, consisting of at least one insulation element being a bonded mineral fibre product made of mineral fibres and a cured aqueous binder composition, whereby the insulation element is adapted to be fixed to an outer surface of the building by mechanical fastening elements and/or an adhesive, covered with a rendering, and whereby the aqueous binder composition prior to curing comprises a first component in form of one or more oxidized lignins, a second component in form of one or more cross-linkers, and a third component in form of one or more plasticizers, and whereby the insulation element has a bulk density between 70 kg/m$^3$ and 150 kg/m$^3$, wherein the third component comprises one or more plasticizers selected from a group consisting of fatty alcohols, monohydroxy alcohols, such as pentanol, stearyl alcohol; and/or one or more plasticizers selected from a group consisting of alkoxylates such as ethoxylates, such as butanol ethoxylates; and/or one or more plasticizers in form of propylene glycols; and/or one or more plasticizers in form of glycol esters; and/or one or more plasticizers selected from a group consisting of adipates, acetates, benzoates, cyclobenzoates, citrates, stearates, sorbates, sebacates, azelates, butyrates, valerates; and/or one or more plasticizers selected from a group consisting of phenol derivatives; and/or one or more plasticizers selected from a group consisting of silanols, siloxanes; and/or one or more plasticizers selected from a group consisting of sulfates sulfonates and/or phosphates; and/or one or more plasticizers in form of hydroxy acids; and/or one or more plasticizers selected from a group consisting of monomeric amides; and/or one or more plasticizers selected from the group consisting of quaternary ammonium compounds; and/or one or more plasticizers selected from a group consisting of vegetable oils; and/or one or more plasticizers selected from a group consisting of hydrogenated oils, acetylated oils; and/or one or more plasticizers selected from acid methyl esters; and/or one or more plasticizers selected from a group consisting of alkyl polyglucosides, gluconamides, aminoglucoseamides, sucrose esters, sorbitan esters; and/or one or more plasticizers selected from a group consisting of polyethylene glycols, polyethylene glycol ethers.

6. A façade system for a building, comprising a thermal and/or acoustic insulation, consisting of at least one insulation element being a bonded mineral fibre product made of mineral fibres and a cured aqueous binder composition, whereby the insulation element is adapted to be fixed to an outer surface of the building by mechanical fastening elements and/or an adhesive, covered with a rendering, and whereby the aqueous binder composition prior to curing comprises a first component in form of one or more oxidized lignins, a second component in form of one or more cross-linkers, and a third component in form of one or more plasticizers, whereby the insulation element has a bulk density between 70 kg/m$^3$ and 150 kg/m$^3$, the aqueous binder composition further comprising a fourth component in form of one or more coupling agents in the binder.

7. A façade system for a building, comprising a thermal and/or acoustic insulation, consisting of at least one insulation element being a bonded mineral fibre product made of mineral fibres and a cured aqueous binder composition, whereby the insulation element is adapted to be fixed to an outer surface of the building by mechanical fastening elements and/or an adhesive, covered with a rendering, and whereby the aqueous binder composition prior to curing comprises a first component in form of one or more oxidized lignins, a second component in form of one or more cross-linkers, and a third component in form of one or more plasticizers, whereby the insulation element has a bulk density between 70 kg/m$^3$ and 150 kg/m$^3$, the aqueous binder composition further comprising a fifth component in form of one or more components selected from a group of ammonia, amines or any salts thereof in the binder.

8. A façade system for a building, comprising a thermal and/or acoustic insulation, consisting of at least one insulation element being a bonded mineral fibre product made of mineral fibres and a cured aqueous binder composition, whereby the insulation element is adapted to be fixed to an outer surface of the building by mechanical fastening elements and/or an adhesive, covered with a rendering, and whereby the aqueous binder composition prior to curing comprises a first component in form of one or more oxidized lignins, a second component in form of one or more cross-linkers, and a third component in form of one or more plasticizers, whereby the insulation element has a bulk density between 70 kg/m$^3$ and 150 kg/m$^3$, whereby the binder consists essentially of a first component in form of one or more oxidized lignins;

a second component in form of one or more cross-linkers;

a third component in form of one or more plasticizers;

a fourth component in form of one or more coupling agents; and water.

* * * * *